US012770550B2

(12) United States Patent
Wang et al.

(10) Patent No.: US 12,770,550 B2
(45) Date of Patent: Oct. 20, 2026

(54) DISPLAY SUBSTRATE, CONTROL METHOD THEREFOR, AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Zhu Wang, Beijing (CN); Zhenglong Yan, Beijing (CN); Yanyang Shang, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 57 days.

(21) Appl. No.: 18/857,205

(22) PCT Filed: Jan. 17, 2024

(86) PCT No.: PCT/CN2024/072767
§ 371 (c)(1),
(2) Date: Oct. 16, 2024

(87) PCT Pub. No.: WO2024/174775
PCT Pub. Date: Aug. 29, 2024

(65) Prior Publication Data
US 2025/0273126 A1 Aug. 28, 2025

(30) Foreign Application Priority Data
Feb. 23, 2023 (CN) ........................ 202310182165.4

(51) Int. Cl.
*G09G 3/3266* (2016.01)
*G09G 3/32* (2016.01)

(52) U.S. Cl.
CPC ............ *G09G 3/32* (2013.01); *G09G 3/3266* (2013.01); *G09G 2310/0267* (2013.01); *G09G 2330/021* (2013.01)

(58) Field of Classification Search
CPC .................. G09G 3/32; G09G 3/3266; G09G 2310/0267; G09G 2330/021; G09G 2300/0426; G09G 2310/08; G09G 3/20
See application file for complete search history.

(56) References Cited

U.S. PATENT DOCUMENTS

2008/0024529 A1* 1/2008 Asano .................. G09G 3/3233 345/697
2018/0366495 A1* 12/2018 Xu .................... G02F 1/136286
(Continued)

FOREIGN PATENT DOCUMENTS

CN 104123906 A 10/2014
CN 106782290 A 5/2017
(Continued)

OTHER PUBLICATIONS

International Search Report for PCT/CN2024/072767 Mailed Apr. 13, 2024.
(Continued)

*Primary Examiner* — Nitin Patel
*Assistant Examiner* — Gloryvid Figueroa-Gibson

(57) ABSTRACT

A display substrate, including: a substrate, a plurality of sub-pixels and a plurality of driving circuits. The substrate includes a display area, the display area including a plurality of display partitions; the plurality of sub-pixels are located in the display area; and at least one of the plurality of driving circuits corresponds to one display partition. At least one driving circuit is configured to provide a gate driving signal to a plurality of sub-pixels in a corresponding display partition, such that the display refreshing frequencies of the
(Continued)

plurality of display partitions are the same or at least partially different.

19 Claims, 12 Drawing Sheets

(56) References Cited

U.S. PATENT DOCUMENTS

| | | | | |
|---|---|---|---|---|
| 2021/0384229 | A1* | 12/2021 | Lee | H10D 30/6757 |
| 2022/0208929 | A1* | 6/2022 | Min | H10D 86/451 |

FOREIGN PATENT DOCUMENTS

| | | | | | |
|---|---|---|---|---|---|
| CN | 106847158 | A | | 6/2017 | |
| CN | 206848659 | U | | 1/2018 | |
| CN | 207264753 | U | * | 4/2018 | |
| CN | 109697966 | A | * | 4/2019 | G11C 19/28 |
| CN | 109933234 | A | | 6/2019 | |
| CN | 110491331 | A | | 11/2019 | |
| CN | 111474785 | A | | 7/2020 | |
| CN | 112562570 | A | | 3/2021 | |
| CN | 115311996 | A | | 11/2022 | |
| CN | 115798382 | A | | 3/2023 | |
| CN | 116229866 | A | | 6/2023 | |
| JP | 2004070300 | A | | 3/2004 | |
| JP | 2007298769 | A | | 11/2007 | |

OTHER PUBLICATIONS

Office Action dated Jan. 5, 2026 for CN 202310182165.4 and English Translation.

* cited by examiner

DISPLAY SUBSTRATE, CONTROL METHOD THEREFOR, AND DISPLAY APPARATUS

CROSS-REFERENCE TO RELATED APPLICATION

The present application is a U.S. National Phase Entry of International Application No. PCTCN2024072767 having an international filing date of Jan. 17, 2024, which claims the priority to Chinese Patent Application No. 202310182165.4 filed on Feb. 23, 2023 and titled with "Display Substrate, Control Method Therefor, and Display Apparatus". The above-identified applications are hereby incorporated by reference.

TECHNICAL FIELD

The present disclosure relates to, but is not limited to, the field of display technologies, and particularly to a display substrate and a control method therefor, and a display apparatus.

BACKGROUND

In recent years, with the rapid development of display industry, display screens are used in various industries, such as mobile phones, bracelets, watches, car displays, laptop computers, televisions and so on. With the increasing application scenarios of display products, consumers have higher and higher requirements for the display products. For example, the consumers have different display requirements for different regions of the display screen.

SUMMARY

The following is a summary of subject matters described herein in detail. This summary is not intended to limit the protection scope of claims.

Embodiments of the present disclosure provide a display substrate, a control method therefor, and a display apparatus.

In one aspect, an embodiment of the present disclosure provides a display substrate including a base substrate, a plurality of sub-pixels, and a plurality of drive circuits. The base substrate includes a display region including a plurality of display partitions. The plurality of sub-pixels are located in the display region. At least one drive circuit of the plurality of drive circuits corresponds to one display partition. The at least one drive circuit is configured to provide a gate drive signal to a plurality of sub-pixels within a corresponding display partition such that display refresh frequencies of the plurality of display partitions are the same or at least partially different.

In some exemplary embodiments, the plurality of display partitions at least includes a first partition and a second partition, and the first partition and the second partition are adjacent along one direction. The plurality of drive circuits at least include one first drive circuit and at least one second drive circuit; wherein the at least one first drive circuit is configured to provide a gate drive signal to a plurality of sub-pixels within the first partition, and the at least one second drive circuit is configured to provide a gate drive signal to a plurality of sub-pixels within the second partition.

In some exemplary embodiments, the display substrate further includes a first control circuit connected between the first drive circuit and an second drive circuit adjacent to the first drive circuit, wherein the first control circuit is configured to control display refresh frequencies of the first partition and the second partition to be the same or different.

In some exemplary embodiments, the first drive circuit at least includes a plurality of cascaded first scan control units, and the second drive circuit at least includes a plurality of cascaded second scan control units. The first control circuit is configured to, under a control of a first control line and a second control line, connect an output terminal of a last-stage first scan control unit of the first drive circuit and an input terminal of a first-stage second scan control unit of the second drive circuit, or to connect a second start signal line and the input terminal of the first-stage second scan control unit of the second drive circuit.

In some exemplary embodiments, the first control circuit includes a first control transistor and a second control transistor. A gate electrode of the first control transistor is electrically connected with the first control line, a first electrode of the first control transistor is electrically connected with the output terminal of the last-stage first scan control unit of the first drive circuit, and a second electrode of the first control transistor is electrically connected with the input terminal of the first-stage second scan control unit of the second drive circuit. A gate electrode of the second control transistor is electrically connected with the second control line, a first electrode of the second control transistor is electrically connected with the second start signal line, and a second electrode of the second control transistor is electrically connected with the input terminal of the first-stage second scan control unit of the second drive circuit.

In some exemplary embodiments, the display substrate further includes at least one first data line electrically connected with the plurality of sub-pixels within the first partition and at least one second data line electrically connected with the plurality of sub-pixels within the second partition. The at least one first data line and the at least one second data line have a same extension direction and are in a same layer.

In some exemplary embodiments, within the first partition, the at least one first data line is electrically connected with a first data auxiliary line through a first transfer line, an extension direction of the first transfer line intersects with an extension direction of the first data auxiliary line, and the first data auxiliary line extends to the second partition.

In some exemplary embodiments, the first transfer line is located on a side of the first data auxiliary line close to the base substrate, and the first data auxiliary line and the first data line are in a same layer.

In some exemplary embodiments, the plurality of display partitions further include a third partition adjacent to the first partition in a first direction, the second partition located on a same side of the first partition and the third partition in a second direction; and the first direction intersects with the second direction. The plurality of drive circuits include one first drive circuit, two second drive circuits, and one third drive circuit, the third drive circuit is configured to provide a gate drive signal to a plurality of sub-pixels within the third partition. The two second drive circuits are located on two opposite sides of the second partition along the first direction, the first drive circuit is adjacent to the first partition in the first direction, the third drive circuit is adjacent to the third partition in the first direction, the first drive circuit is adjacent to one second drive circuit in the second direction, and the third drive circuit is adjacent to another second drive circuit in the second direction.

In some exemplary embodiments, the display substrate further includes a second control circuit connected between the third drive circuit and a second drive circuit adjacent to the third drive circuit, and the second control circuit configured to control display refresh frequencies of the second partition and the third partition to be the same or different.

In some exemplary embodiments, the third drive circuit at least includes a plurality of cascaded third scan control units; and the second drive circuit at least includes a plurality of cascaded second scan control units. The second control circuit is configured to, under a control of the first control line and a second control line, connect an output terminal of a last-stage third scan control unit of the third drive circuit and an input terminal of a first-stage second scan control unit of an second drive circuit adjacent to the third drive circuit, or connect a second start signal line and the input terminal of the first-stage second scan control unit of the second drive circuit adjacent to the third drive circuit.

In some exemplary embodiments, the display substrate further includes at least one third data line electrically connected with the plurality of sub-pixels within the third partition; wherein within the third partition, the at least one third data line is electrically connected with a second data auxiliary line through a second transfer line, an extension direction of the second transfer line intersects with an extension direction of the second data auxiliary line, and the second data auxiliary line extends to the second partition.

In some exemplary embodiments, the second transfer line is located on a side of the second data auxiliary line close to the base substrate, and the second data auxiliary line and the third data line are in a same layer.

In some exemplary embodiments, in a direction perpendicular to the display substrate, the display region includes: a base substrate, and a first semiconductor layer, a first conductive layer, a second conductive layer, a second semiconductor layer, a third conductive layer, a fourth conductive layer, a fifth conductive layer and a sixth conductive layer that are disposed on the base substrate; the first transfer line is located in the fifth conductive layer, and the first data auxiliary line, the first data line, and the second data line are located in the sixth conductive layer.

In some exemplary embodiments, the sub-pixels include pixel circuits, and the display region includes at least one pixel circuit group including two pixel circuits disposed adjacent to each other along a direction, wherein the two pixel circuits in the at least one pixel circuit group are disposed symmetrically with respect to a centerline of the pixel circuit group in the direction.

In some exemplary embodiments, the two pixel circuits in the at least one pixel circuit group are electrically connected with a same first power supply line, the first power supply line is located between data lines which are respectively electrically connected with the two pixel circuits, and the first data auxiliary line is located on a side of the data line which is electrically connected with the pixel circuit away from the first power supply line.

In another aspect, an embodiment of the present disclosure provides a display apparatus, which includes the aforementioned display substrate.

In another aspect, an embodiment of the present disclosure further provides a control method for a display substrate, which is applied to the display substrate as described above, and includes: at least one drive circuit providing a gate drive signal to a plurality of sub-pixels in a corresponding display partition so that display refresh frequencies of the plurality of display partitions are the same or at least partially different, where the at least one drive circuit corresponds to one display partition.

In some exemplary embodiments, the plurality of display partitions at least includes a first partition and a second partition, and the first partition and the second partition are adjacent along one direction. The at least one drive circuit provides the gate drive signal to the plurality of sub-pixels within the corresponding display partition, including: when display refresh frequencies of the first partition and the second partition are the same, the first control circuit connects an output terminal of a last-stage first scan control unit of the first drive circuit and an input terminal of a first-stage second scan control unit of the second drive circuit under a control of a first control line and a second control line; when the display refresh frequencies of the first partition and the second partition are different, the first control circuit connects a second start signal line and the input terminal of the first-stage second scan control unit of the second drive circuit under the control of the first control line and the second control line.

In some exemplary embodiments, the plurality of display partitions further include a third partition adjacent to the first partition in a first direction, the second partition located on a same side of the first partition and the third partition in a second direction; and the first direction intersects with the second direction. The at least one drive circuit provides the gate drive signal to the plurality of sub-pixels in the corresponding display partition, further including: when display refresh frequencies of a second partition and a third partition are the same, the second control circuit, under the control of the first control line and the second control line, connects an output terminal of a last-stage third scan control unit of a third drive circuit and an input terminal of a first-stage second scan control unit of the second drive circuit adjacent to the third drive circuit; when the display refresh frequencies of the second partition and the third partition are different, the second control circuit, under the control of the first control line and the second control line, connects a second start signal line and the input terminal of the first-stage second scan control unit of the second drive circuit adjacent to the third drive circuit.

Other aspects of the present disclosure may be comprehended after the drawings and the detailed descriptions are read and understood.

BRIEF DESCRIPTION OF DRAWINGS

Accompanying drawings are used for providing further understanding of technical solutions of the present disclosure, constitute a portion of the specification, and are used for explaining the technical solutions of the present disclosure together with embodiments of the present disclosure, but do not constitute limitations on the technical solutions of the present disclosure. Shapes and sizes of one or more components in the drawings do not reflect actual scales, but are only intended to schematically describe contents of the present disclosure.

DETAILED DESCRIPTION

Figure 1:
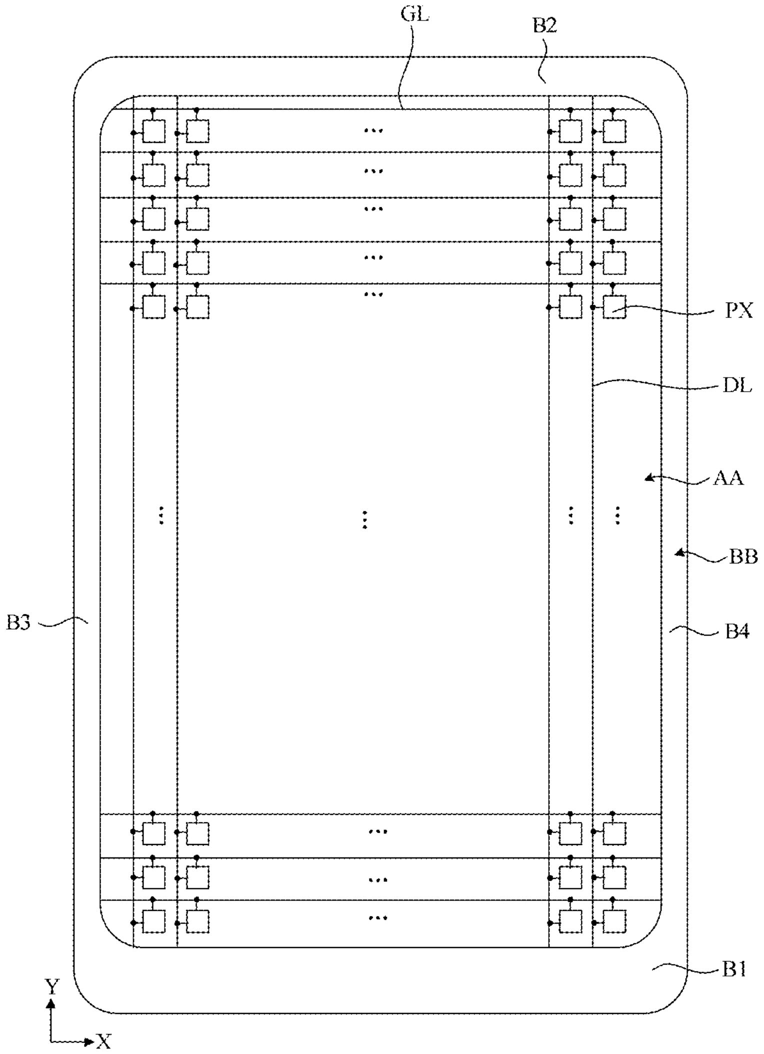
FIG. 1 is a schematic plan view of a display substrate according to at least one embodiment of the present disclosure.

The embodiments of the present disclosure will be described below with reference to the drawings in detail. Implementation modes may be implemented in a plurality of different forms. Those of ordinary skills in the art may easily understand such a fact that implementations and contents may be transformed into other forms without departing from the purpose and scope of the present disclosure. Therefore, the present disclosure should not be explained as being limited to the contents recorded in the following implementation modes only. The embodiments and features in the embodiments of the present disclosure may be randomly combined with each other if there is no conflict.

In the drawings, a size of one or more constituent elements, a thickness of a layer, or a region is sometimes exaggerated for clarity. Therefore, one implementation of the present disclosure is not necessarily limited to the size, and a shape and a size of one or more components in the drawings do not reflect an actual scale. In addition, the accompanying drawings schematically illustrate ideal examples, and an implementation of the present disclosure is not limited to shapes, numerical values, or the like shown in the drawings.

Ordinal numerals "first", "second", "third", etc., in the specification are set not to form limits in numbers but only to avoid confusion between composition elements. In the present disclosure, "plurality" represents two or more than two.

In the specification, for convenience, expressions "central", "above", "below", "front", "back", "vertical", "horizontal", "top", "bottom", "inside", "outside", etc., indicating directional or positional relationships are used to illustrate positional relationships between the composition elements with reference to the accompanying drawings, not to indicate or imply that involved devices or elements are required to have specific orientations and be structured and operated with the specific orientations but only to easily and simply describe the present specification, and thus should not be understood as limitations on the present disclosure. The positional relationships between the constituent elements are changed as appropriate according to directions of the constituent elements described. Therefore, appropriate replacements based on situations are allowed, which is not limited to the expressions in the specification.

In the specification, unless otherwise specified and defined, terms "mounting", "mutual connection", and "connection" should be understood in a broad sense. For example, it may be a fixed connection, a detachable connection, or an integral connection; it may be a mechanical connection or a connection; it may be a direct connection, an indirect connection through a middleware, or an internal communication inside two elements. Those of ordinary skills in the art may understand meanings of the aforementioned terms in the present disclosure according to situations.

In the specification, an "electrical connection" includes a case that constituent elements are connected together through an element with a certain electrical action. The "element with a certain electrical effect" is not particularly limited as long as electrical signals between the connected constituent elements may be transmitted. Examples of the "element having some electrical function" not only include an electrode and a wiring, but also include a switching element such as a transistor, a resistor, an inductor, a capacitor, another element with a plurality of functions, etc.

In the specification, a transistor refers to an element which at least includes three terminals, i.e., a gate electrode, a drain electrode, and a source electrode. The transistor has a channel region between the drain electrode (drain electrode terminal, drain electrode region, or drain electrode) and the source electrode (source electrode terminal, source electrode region, or source electrode), and a current can flow through the drain electrode, the channel region, and the source electrode. In the specification, the channel region refers to a region through which a current mainly flows.

In the specification, a first electrode may be a drain and a second electrode may be a source, or, a first electrode may be a source and a second electrode may be a drain. In a case that transistors with opposite polarities are used, or in a case that a direction of a current is changed during operation of a circuit, or the like, functions of the "source electrode" and the "drain electrode" are sometimes interchangeable. Therefore, the "source electrode" and the "drain electrode" are interchangeable in the specification. In addition, the gate electrode may also be referred to as a control electrode.

In the specification, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 80° and below 100°, and thus may include a state in which the angle is above 85° and below 95°.

In this specification, a circle, oval, triangle, rectangle, trapezoid, pentagon or hexagon, etc. is not strictly speaking, but may be an approximate circle, oval, triangle, rectangle, trapezoid, pentagon or hexagon, etc. Some small deformations due to tolerances may exist, for example, chamfers, curved edges and deformations thereof may exist.

In the present disclosure, "about" and "substantially" refer to that a boundary is not defined strictly and a case within a range of process and measurement errors is allowed. In the present disclosure, "substantially the same" refers to a case where numerical values differ by less than 10%.

In the present disclosure, "A extends along a B direction" means that A may include a main body portion and a secondary portion connected with the main body portion, the main body portion is a line, a line segment, or a strip-shaped body, the main body portion extends along the B direction, and a length of the main body portion extending along the B direction is greater than a length of the secondary portion extending along another direction. "A extends along the B direction" in the present disclosure means "the main portion of A extends along the B direction".

The present embodiment provides a display substrate including a base substrate, a plurality of sub-pixels disposed on the base substrate, and a plurality of drive circuits. The base substrate includes a display region including a plurality of display partitions. The plurality of sub-pixels are located in the display region. At least one drive circuit corresponds to one display partition. The at least one drive circuit is configured to provide a gate drive signal to a plurality of sub-pixels within a corresponding display partition such that display refresh frequencies (such as "frame frequency") of the plurality of display partitions are the same or at least partially different. For example, under the control of the plurality of drive circuits, the display refresh frequencies of the plurality of display partitions may be different from each other, or the display refresh frequencies of at least two display partitions of the plurality of display partitions may be substantially the same, for example, the display refresh frequencies of the plurality of display partitions may be substantially the same.

In some examples, the display refresh frequency of the at least one display partition may range from 1 Hz to 240 Hz. The present embodiment is not limited thereto.

In the display substrate provided by the present embodiment, by dividing the display region into a plurality of display partitions, and providing a gate drive signal to sub-pixels within the corresponding display partitions by at least one drive circuit, a plurality of different display refresh frequencies can be simultaneously implemented on different regions of the same display substrate, thereby satisfying the display requirements of different regions of the display substrate and reducing the power consumption of the display substrate.

In some exemplary embodiments, the plurality of display partitions may at least include a first partition and a second partition. The first partition and the second partition are adjacent in one direction. The plurality of drive circuits may at least include one first drive circuit and at least one second drive circuit. The at least one first drive circuit may be configured to provide a gate drive signal to a plurality of sub-pixels within the first partition. The at least one second drive circuit may be configured to provide a gate drive signal to a plurality of sub-pixels within the second partition. The display substrate of the present example may provide two display partitions that meet different display needs.

In some exemplary embodiments, the plurality of display partitions may include a first partition, a second partition, and a third partition. The first partition and the third partition may be adjacent in the first direction, and the second partition may be located on a same side of the first partition and the third partition in the second direction. The first direction may intersect with the second direction. The display substrate of the present example may provide three display partitions that meet different display needs. However, the present embodiment is not limited thereto.

Solutions of the embodiments will be described below through some examples.

FIG. 1 is a schematic plan view of a display substrate according to at least one embodiment of the present disclosure. In some examples, as shown in FIG. 1, the display substrate of the present embodiment may include a display region AA, and a peripheral region BB surrounding a periphery of the display region AA. The peripheral region BB may include a first bezel region located on one side of the display region AA, and a second bezel region located on other sides of the display region AA. For example, the first bezel region may include a lower bezel B1 of the display substrate, and the second bezel region may include an upper bezel B2, a left bezel B3, and a right bezel B4 of the display substrate. The upper bezel B2 is opposite to the lower bezel B1, and the left bezel B3 is opposite to the right bezel B4.

In some examples, as shown in FIG. 1, the display region AA may be a planar region including a plurality of sub-pixels PX forming a pixel array, the plurality of sub-pixels PX may be configured to display a dynamic picture or a static image. The display region AA may be referred to as an effective region. In some examples, the display substrate may be a flexible substrate. Accordingly, the display substrate may be deformable, for example, crimped, bent, folded, or curled.

In some examples, the second bezel region may include a circuit region, a power supply line region, a crack dam region, and a cutting region which are sequentially disposed along a direction of the display region AA. The circuit region may be connected to the display region AA, and the circuit region may at least include one drive circuit, for example, each drive circuit may include a plurality of cascaded shift registers, and the plurality of shift registers may be electrically connected with a plurality of gate lines in the display region AA. The power supply line region is connected to the circuit region and may at least include a low-level power supply line. The low-level power supply line may extend along a direction parallel to an edge of the display region and is connected to a cathode in the display region AA. The crack dam region may be connected to the power supply line region and may at least include a plurality of cracks provided on a composite insulation layer. The cutting region may be connected to the crack dam region, and may at least include cutting grooves provided on the composite insulation layer. The cutting grooves are configured such that a cutting device cuts along the cutting grooves respectively after preparation of all film layers of the display substrate is completed.

In some examples, the first bezel region and the second bezel region may be provided with a first isolation dam and a second isolation dam, which may extend along a direction parallel to an edge of the display region to form a ring structure surrounding the display region AA, and the edge of the display region may be an edge of the display region close to the first bezel region or the second bezel region.

In some examples, as shown in FIG. 1, the display region AA may at least include a plurality of sub-pixels PX, a plurality of gate lines GL, and a plurality of data lines DL. The plurality of gate lines GL may extend along a first direction X, and the plurality of data lines DL may extend along a second direction Y. Orthographic projections of the plurality of gate lines GL on the base substrate and orthographic projections of the plurality of data lines DL on the base substrate intersect to form a plurality of sub-pixel regions, and each sub-pixel region is provided with one sub-pixel PX. The plurality of data lines DL are electrically connected with the plurality of sub-pixels PX and the plurality of data lines DL may be configured to provide data signals to the plurality of sub-pixels PX. The plurality of data lines DL may extend to the lower bezel B1 (such as a banding area). The plurality of gate lines GL are electrically connected with the plurality of sub-pixels PX and the plurality of gate lines GL may be configured to provide a gate control signal to the plurality of sub-pixels PX. In some examples, the gate control signals may include a scan signal and a light emitting control signal. As another example, the gate control signal may include a scan signal, a light emitting control signal, and a reset control signal.

In some examples, as shown in FIG. 1, the first direction X may be an extension direction (row direction) of the gate lines GL in the display region AA, and the second direction Y may be an extension direction (column direction) of the data lines DL in the display region AA. The first direction X may intersect with the second direction Y, for example, the first direction X and the second direction Y may be perpendicular to each other.

In some examples, a pixel unit of the display region AA may include three sub-pixels which are a red sub-pixel, a green sub-pixel, and a blue sub-pixel respectively. However, the present embodiment is not limited thereto. In some examples, one pixel unit may include four sub-pixels, and the four sub-pixels are a red sub-pixel, a green sub-pixel, a blue sub-pixel, and a white sub-pixel respectively.

In some examples, a shape of a sub-pixel may be a rectangle, a rhombus, a pentagon, or a hexagon. When one pixel unit includes three sub-pixels, the three sub-pixels may be arranged in parallel in a horizontal direction, in parallel in a vertical direction, or in a delta-shaped arrangement. When one pixel unit includes four sub-pixels, the four sub-pixels may be arranged in parallel in a horizontal direction, in parallel in a vertical direction, or in a shape forming a square. However, the present embodiment is not limited thereto.

In some examples, one sub-pixel may include a pixel circuit and a light emitting element electrically connected with the pixel circuit. The pixel circuit may include a plurality of transistors and at least one capacitor. For example, the pixel circuit may have a 3T1C, 4T1C, 5T1C, 5T2C, 6T1C, 7T1C, or 8T1C structure. In the above-mentioned circuit structures, T refers to a thin film transistor, C refers to a capacitor, a digit before T represents a quantity of thin film transistors in the circuit, and a digit before C represents a quantity of capacitors in the circuit.

In some examples, the plurality of transistors in the pixel circuit may be P-type transistors or may be N-type transistors. Usage of same type of transistors in the pixel circuit may simplify a process flow, reduce a process difficulty of the display substrate, and improve a yield of a product. In some other examples, the plurality of transistors in the pixel circuit may include a P-type transistor and an N-type transistor.

In some examples, low temperature poly silicon thin film transistors, or oxide thin film transistors, or both a low temperature poly silicon thin film transistor and an oxide thin film transistor may be used as the plurality of transistors in the pixel circuit. Low Temperature Poly Silicon (LTPS) is adopted for an active layer of a low temperature poly silicon thin film transistor and an oxide semiconductor (Oxide) is adopted for an active layer of an oxide thin film transistor. The low temperature poly silicon thin film transistor has advantages such as a high migration rate and fast charging, and the oxide thin film transistor has advantages such as a low leakage current. The low temperature poly silicon thin film transistor and the oxide thin film transistor are integrated on one display substrate, that is, an LTPS+Oxide (LTPO for short) display substrate, advantages of both the low temperature poly silicon thin film transistor and the oxide thin film transistor may be utilized, so that low-frequency drive can be achieved, power consumption can be reduced, and display quality can be improved.

In some examples, the light emitting element may be any of a Light Emitting Diode (LED), an Organic Light Emitting Diode (OLED), a Quantum dot Light Emitting Diode (QLED), a micro LED (including: mini-LED or micro-LED), and the like. For example, the light emitting element may be an OLED, and the light emitting element may emit red light, green light, blue light, or white light, etc. under driving of a pixel circuit corresponding to the light emitting element. A color of light emitted by the light emitting element may be determined as required. In some examples, the light emitting element may include an anode, a cathode, and an organic light emitting layer located between the anode and the cathode. The anode of the light emitting element may be electrically connected with a corresponding pixel circuit. However, the present embodiment is not limited thereto.

Figure 2:
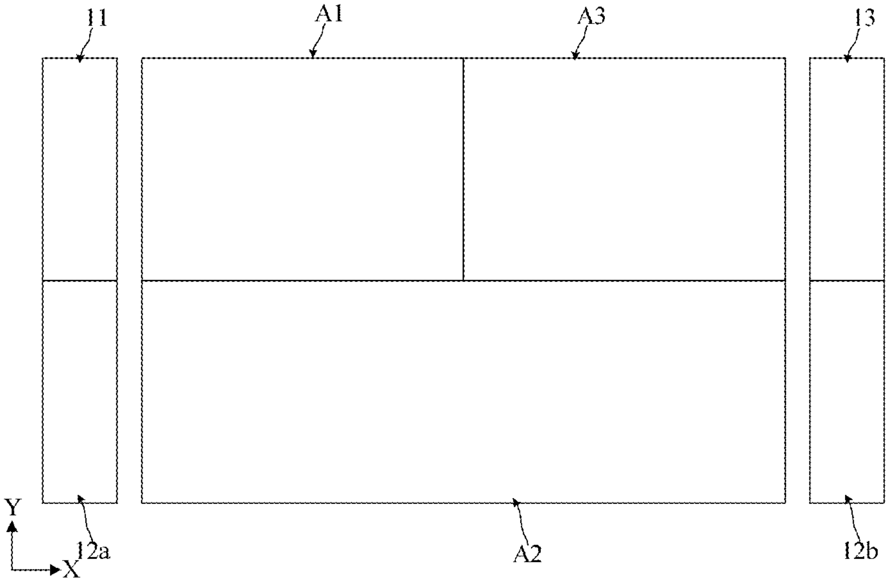
FIG. 2 is a partial schematic diagram of a display substrate according to at least one embodiment of the present disclosure.

FIG. 2 is a partial schematic diagram of a display substrate according to at least one embodiment of the present disclosure. In some examples, as shown in FIG. 2, the display region of the display substrate may include three display partitions (e.g., including a first partition A1, a second partition A2, and a third partition A3). The first partition A1 and the third partition A3 may be adjacent to each other in the first direction X, and the second partition A2 may be located on a same side of the first partition A1 and the third partition A3 in the second direction Y. In some examples, shapes of the first partition A1, the second partition A2, and the third partition A3 may be substantially the same, e.g., may all be substantially a rectangular. An area of the first partition A1 and an area of the third partition A3 may be substantially the same; an area of the second partition A2 may be greater than the areas of the first partition A1 and of the third partition A3, for example, the area of the second partition A2 may be a sum of the areas of the first partition A1 and the third partition A3. The present embodiment is not limited thereto. In other examples, the area of the first partition A1 may be less than or equal to the area of the third partition A3. For another example, the area of the first partition A1, the area of the second partition A2, and the area of the third partition A3 may be substantially the same.

In some examples, as shown in FIG. 2, a plurality of drive circuits may be provided in the peripheral region of the display substrate, and may include, for example, a first drive circuit 11, two second drive circuits 12*a* and 12*b*, and a third drive circuit 13. The first driver circuit 11 and the second driver circuit 12*a* may be located on the left bezel of the display substrate, and the first driver circuit 11 and the second driver circuit 12*a* may be arranged sequentially along the second direction Y. The second drive circuit 12*b* and the third drive circuit 13 may be located on the right bezel of the display substrate, and the third drive circuit 13 and the second drive circuit 12*b* may be arranged sequentially along the second direction Y.

In some examples, as shown in FIG. 2, the first drive circuit 11 may be adjacent to the first partition A1 in the first direction X, and the first drive circuit 11 may be located on a side of the first partition A1 away from the third partition A3 in the first direction X. The first drive circuit 11 may be configured to provide a gate drive signal to a plurality of sub-pixels within the first partition A1. The third drive circuit 13 may be located on a side of the third partition A3 away from the first partition A1 in the first direction X, and the third drive circuit 13 may be adjacent to the third partition A3 in the first direction X. The third drive circuit 13 may be configured to provide a gate drive signal to a plurality of sub-pixels within the third partition A3.

In some examples, as shown in FIG. 2, the second drive circuit 12*a* and second drive circuit 12*b* may be located on two opposite sides of the second partition A2 in the first direction X. The second drive circuit 12*a* and second drive circuit 12*b* may be configured to provide a gate drive signal to a plurality of sub-pixels within the second partition A2. Structures of the second drive circuit 12*a* and second drive circuit 12*b* may be substantially the same.

In the present example, the sub-pixels within the first partition A1 are driven unilaterally by the first drive circuit 11 provided within the left bezel, the sub-pixels within the third partition A3 may be driven unilaterally by the third drive circuit 13 provided within the right bezel, and the sub-pixels within the second partition A2 may be driven bilaterally by the second drive circuit 12*a* provided in the left bezel and the second drive circuit 12*b* provided in the right bezel. An arrangement of the drive circuits and the circuit layout in the peripheral region of the present example circuit may ensure a signal driving in the display region.

In some examples, a gate line of the first partition A1 and a gate line of the third partition A3 may be disconnected at a junction of the first partition A1 and the third partition A3, so that the gate line of the first partition A1 and the gate line of the third partition A3 may independently control a signal writing state of sub-pixels of a corresponding display partition. By controlling a frequency of a start signal of the first drive circuit 11, the second drive circuit 12*a*, the second drive circuit 12*b*, and the third drive circuit 13, an effect of controlling display refresh frequencies of different display partitions can be achieved.

In some examples, display refresh frequencies of the first partition A1, the second partition A2, and the third partition A3 may be different or partially different. For example, a display refresh frequency of the first partition A1 may be 1 Hz, a display refresh frequency of the third partition A3 may be 30 Hz, and a display refresh frequency of the second partition A2 may be 240 Hz. However, the present embodiment is not limited thereto. In other examples, display refresh frequencies of the three display partitions may be dynamically adjusted according a display requirement.

Figure 3:
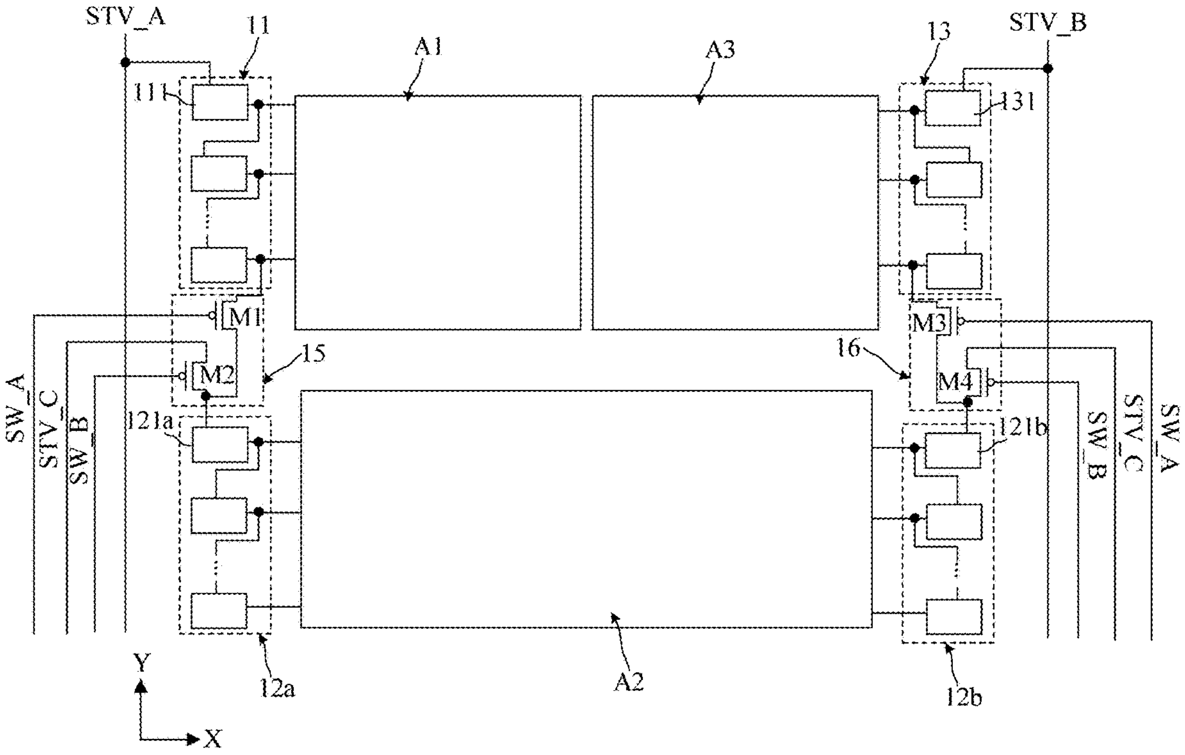
FIG. 3 is a schematic diagram of a drive circuit and a control circuit according to at least one embodiment of the present disclosure.

FIG. 3 is a schematic diagram of a drive circuit and a control circuit according to at least one embodiment of the present disclosure. In the present example, the drive circuit and the control circuit will be described by taking a scan signal provided to the display region as an example.

In some examples, as shown in FIG. 3, the first drive circuit 11 may at least include a plurality of cascaded first scan control units 111. An input terminal of a first-stage first scan control unit 111 may be electrically connected with a first start signal line STV_A, and an output terminal may be electrically connected with an input terminal of a second-stage first scan control unit 111. An input terminal of a first scan control unit 111 other than the first-stage first scan control unit 111 may be electrically connected with an output terminal of a previous stage first scan control unit 111. An output terminal of any stage of first scan control unit 111 may be electrically connected with a scan line within the first partition A1, and may be configured to provide a scan control signal to at least one row of sub-pixels within the first partition A1 through the scan line.

In some examples, as shown in FIG. 3, the third drive circuit 13 may at least include a plurality of cascaded third scan control units 131. An input terminal of a first-stage third scan control unit 131 may be electrically connected with a third start signal line STV_B, and an output terminal may be electrically connected with an input terminal of a second-stage third scan control unit 131. An input terminal of a third scan control unit 131 other than the first-stage third scan control unit 131 may be electrically connected with an output terminal of a previous stage third scan control unit 131. An output terminal of any stage of third scan control unit 131 may be electrically connected with a scan line within the third partition A3, and may be configured to provide a scan control signal to at least one row of sub-pixels within the third partition A3 through the scan line.

In some examples, as shown in FIG. 3, the second drive circuit 12*a* may at least include a plurality of cascaded second scan control units 121*a*. An input terminal of a first-stage second scan control unit 121*a* may be electrically connected with a first control circuit 15, and an output terminal may be electrically connected with an input terminal of a second-stage second scan control unit 121*a*. An input terminal of a second scan control unit 121*a* other than the first-stage second scan control unit 121*a* may be electrically connected with an output terminal of a previous stage second scan control unit 121*a*. An output terminal of any stage of second scan control unit 121*a* may be electrically connected with a scan line within the second partition A2, and may be configured to provide a scan control signal to at least one row of sub-pixels within the second partition A2 through the scan line. The second drive circuit 12*b* may at least include a plurality of cascaded second scan control units 121*b*. A cascade mode of the plurality of second scan control units 121*b* is the same as a cascade mode of the plurality of first scan control units 121*a*, and will not be repeated here. An output terminal of any stage of second scan control unit 121*a* may be electrically connected with the scan line within the second partition A2, and may be configured to provide a scan control signal to at least one row of sub-pixels within the second partition A2 through the scan line. Scan control signals provided by the second drive circuit 12*a* and the second drive circuit 12*b* to a same row of sub-pixels within the second partition A2 may be the same. In this example, a validity of the scan control signal can be guaranteed by providing a bilateral drive to the second partition A2.

In some examples, as shown in FIG. 3, the first control circuit 15 may be connected between the first drive circuit 11 and an adjacent second drive circuit 12*a*; and a second control circuit 16 may be connected between the third drive circuit 13 and an adjacent second drive circuit 12*b*. The first control circuit 15 may be configured to, under a control of a first control line SW_A and a second control line SW_B, turn on an output terminal of a last-stage first scan control unit 111 of the first drive circuit 11 and an input terminal of a first-stage second scan control unit 121*a* of the second drive circuit 12*a*, or to turn on a second start signal line STV_C and the input terminal of the first-stage second scan control unit 121*a* of the second drive circuit 12*a*. The second control circuit 16 may be configured to, under the control of the first control line SW_A and the second control line SW_B, turn on an output terminal of a last-stage third scan control unit 131 of the third drive circuit 13 and an input terminal of a first-stage second scan control unit 121*b* of the second drive circuit 12*b*, or to turn on the second start signal line STV_C and the input terminal of the first-stage second scan control unit 121*b* of the second drive circuit 12*b*.

In some examples, as shown in FIG. 3, the first control circuit 15 may include a first control transistor M1 and a second control transistor M2. A gate electrode of the first control transistor M1 may be electrically connected with the first control line SW_A, a first electrode of the first control transistor M1 may be electrically connected with the output terminal of the last-stage of the first scan control unit 111 of the first drive circuit 11, and a second electrode of the first control transistor M1 may be electrically connected with a second electrode of the second control transistor M2. A gate electrode of the second control transistor M2 may be electrically connected with the second control line SW_B, a first electrode of the second control transistor M2 may be electrically connected with the second start signal line STV_C, and the second electrode of the second control transistor M2 may be electrically connected with the input terminal of the first-stage second scan control unit 121*a* of the second drive circuit 12*a*. For example, both the first control transistor M1 and the second control transistor M2 may be P-type transistors. However, the present embodiment is not limited thereto. For example, the first control transistor M1 and the second control transistor M2 may be N-type transistors. For another example, transistor types of the first control transistor M1 and the second control transistor M2 may be different.

In some examples, as shown in FIG. 3, the first control transistor M1 is turned on under a control of the first control line SW_A and the second control transistor M2 is turned off under a control of the second control line SW_B, so that the output terminal of the last-stage first scan control unit 111 of the first drive circuit 11 is electrically connected with the input terminal of the first-stage second scan control unit 121*a* of the second drive circuit 12*a*. A output signal of the last-stage first scan control unit 111 of the first drive circuit 11 is transmitted to the input terminal of the first-stage second scan control unit 121*a* of the second drive circuit 12*a* as a start signal of the first-stage second scan control unit 121*a* of the second drive circuit 12*a*, so that a plurality of stages of second scan control units 121*a* of a plurality of the second driving circuit 12*a* are driven to work at a same frequency as the first scan control unit 111. The first control transistor M1 is turned off under the control of the first control line SW_A and the second control transistor M2 is turned on under the control of the second control line SW_B, so that the input terminal of the first-stage second scan control unit 121*a* of the second drive circuit 12*a* is electrically connected with the second start signal line STV_C. A second start signal is transmitted to the second drive circuit 12*a*, so that the second start signal individually controls the work of the second drive circuit 12*a*, and the plurality of second scan control units 121*a* of the second drive circuit 12*a* are driven to work at a frequency different from that of the first scan control unit 111.

In some examples, as shown in FIG. 3, the second control circuit 16 may at least include a third control transistor M3 and a fourth control transistor M4. A gate electrode of the third control transistor M3 may be electrically connected with the first control line SW_A, a first electrode of the third control transistor M3 may be electrically connected with the output terminal of the last-stage of the third scan control unit 131 of the third drive circuit 13, and a second electrode of the third control transistor M3 may be electrically connected with a second electrode of the fourth control transistor M4. A gate electrode of the fourth control transistor M4 may be electrically connected with the second control line SW_B, a first electrode of the fourth control transistor M4 may be electrically connected with the second start signal line STV_C, and the second electrode of the fourth control transistor M4 may be electrically connected with the input terminal of the first-stage second scan control unit 121*b* of the second drive circuit 12*b*. For example, the third control transistor M3 and the fourth control transistor M4 may be P-type transistors. However, the present embodiment is not limited thereto. For example, the third control transistor M3 and the fourth control transistor M4 may be N-type transistors. For another example, transistor types of the third control transistor M3 and the fourth control transistor M4 may be different.

In some examples, a transistor type of the control transistor within the first control circuit and a transistor type of the control transistor within the second control circuit may be the same to reduce types of control signals. However, the present embodiment is not limited thereto. For example, the transistor type of the control transistor within the first control circuit may be different from the transistor type of the control transistor within the second control circuit.

In some examples, as shown in FIG. 3, the third control transistor M3 is turned on under the control of the first control line SW_A and the fourth control transistor M4 is turned off under the control of the second control line SW_B, so that an output terminal of a last-stage third scan control unit 131 of the third drive circuit 13 is electrically connected with the input terminal of the first-stage second scan control unit 121*b* of the second drive circuit 12*b*. A output signal of the last-stage third scan control unit 131 of the third drive circuit 13 is transmitted to the input terminal of the first-stage second scan control unit 121*b* of the second drive circuit 12*b* as a start signal of the first-stage second scan control unit 121*b* of the second drive circuit 12*b*, so that multi-stage second scan control units 121*b* of the second driving circuit 12*b* are driven to work at a same frequency as the third scan control unit 131. The third control transistor M3 is turned off under the control of the first control line SW_A and the fourth control transistor M4 is turned on under the control of the second control line SW_B, so that the input terminal of the first-stage second scan control unit 121*b* of the second drive circuit 12*b* is electrically connected with the second start signal line STV_C. A second start signal is transmitted to the second drive circuit 12*b*, so that the second start signal individually controls the second drive circuit 12*b*, and the plurality of second scan control units 121*b* of the second drive circuit 12*b* are driven to work at a frequency different from that of the third scan control unit 131.

In some examples, as shown in FIG. 3, the first control circuit 15 may control first scan control units 111 of the first drive circuit 11 and second scan control units 121*a* of the second drive circuit 12*a* to be cascaded, or may control the first drive circuit 11 and the second drive circuit 12*a* to be connected with the first start signal line STV_A and the second start signal line STV_C, respectively. The second control circuit 16 may control third scan control units 131 of the third drive circuit 13 and second scan control units 121*b* of the second drive circuit 12*b* to be cascaded, or may control the third drive circuit 131 and the second drive circuit 12*b* to be connected with the third start signal line STV_B and the second start signal line STV_C, respectively.

Figure 4:
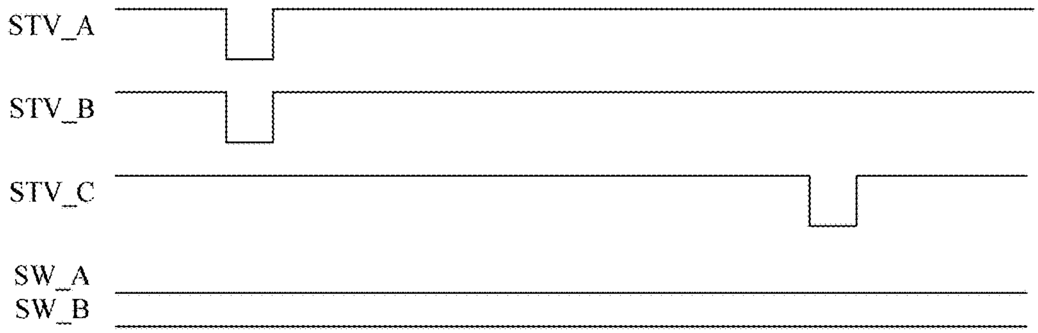
FIG. 4 is a working sequence diagram of a drive circuit and a control circuit according to at least one embodiment of the present disclosure.

FIG. 4 is a working sequence diagram of a drive circuit and a control circuit according to at least one embodiment of the present disclosure. In some examples, as illustrated in FIG. 4, the first control line SW_A may provide a low-level signal so that the first control transistor M1 is turned on, the second control line SW_B may provide a high-level signal so that the second control transistor M2 is turned off, and an output signal of the last-stage first scan control unit 111 of the first drive circuit 11 may serve as a start signal of the second scan control unit 121*a*. The first control line SW_A may provide a low-level signal so that the third control transistor M3 is turned on, the second control line SW_B may provide a high-level signal so that the fourth control transistor M4 is turned off, and an output signal of the last-stage third scan control unit 131 of the third drive circuit 13 may serve as a start signal of the second scan control unit 121*b*. A first start signal provided by the first start signal line STV_A and a third start signal provided by the third start signal line STV_B may be the same, so that frequencies of a scan control signal provided by the first drive circuit 11 to the first partition A1 and a scan control signal provided by the third drive circuit 13 to the third partition A3 are the same. In the present example, under a control of the first drive circuit 11 and the third drive circuit 13, a signal scanning for the first partition A1 and the third partition A3 may be performed first, and then a signal scanning for the second partition A2 may be performed, and refresh frequencies of three display partitions may be the same. An interval between a low-level first start signal provided by the first start signal line STV_A and a low-level second start signal provided by the second start signal line STV_C is configured to be used for scanning a row of the first partition A1 which is the row of total number of scan rows minus one.

In some examples, multi-stage first scan control units 111 may be connected with a first group of clock signal lines, multi-stage third scan control units 131 may be connected with a third group of clock signal lines, and multi-stage second scan control units 121*a* and multi-stage second scan control units 121*b* may be connected with a second group of clock signal lines. The first group of clock signal lines, the second group of clock signal lines, and the third group of clock signal lines may be independently arranged to transmit different clock signals. However, the present embodiment is not limited thereto.

Figure 5:
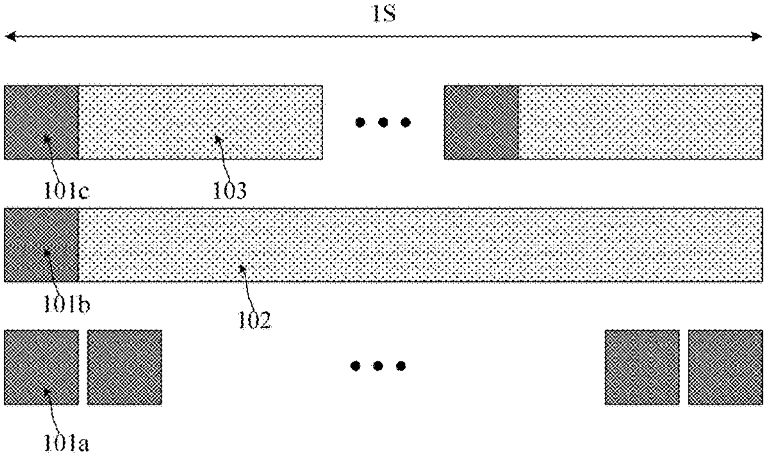
FIG. 5 is a schematic diagram of drive timing allocation of three display partitions according to at least one embodiment of the present disclosure.

FIG. 5 is a schematic diagram of drive timing allocation of three display partitions according to at least one embodiment of the present disclosure. In some examples, a frame period may include a data write phase and a data hold phase, and all times in a frame period other than the data write phase may be the data hold phase. For example, a duration of one frame period is 1 s. Taking display refresh frequencies of the three display partitions as 1 Hz, 30 Hz and 120 Hz respectively as an example, a frequency of 120 Hz is used for data writing. One frame period of a display partition having a display refresh frequency of 30 Hz may include a plurality of write frames 101*c* and a plurality of hold frames 103, and a hold frame 103 is located between adjacent write frames 101*c*. One frame period of a display partition having a display refresh frequency of 1 Hz may include one write frame 101*b* and one hold frame 102. One frame period of a display partition having a display refresh frequency of 120 Hz may include a plurality of write frames 101*a*. In this example, according to a determined frequency of data write, a refresh rate can be allocated in different display partitions in a down-frequency manner. In the present example, a plurality of drive circuits may be connected with a same group of clock signal lines. However, the present embodiment is not limited thereto.

Figure 6:
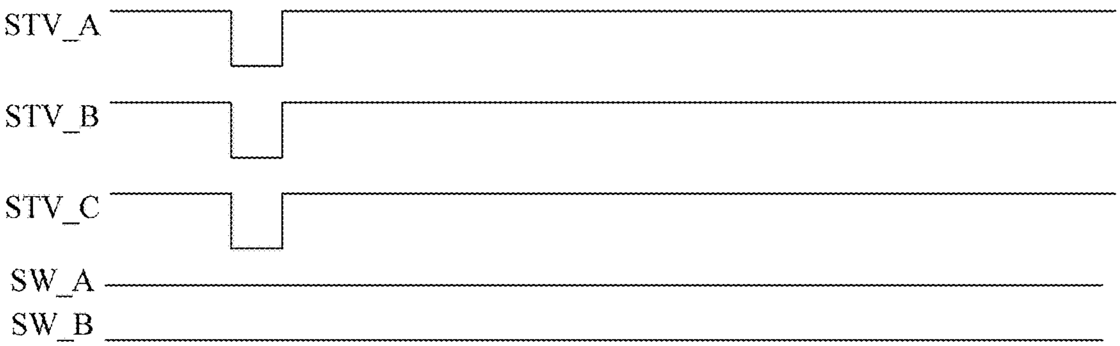
FIG. 6 is another working sequence diagram of a drive circuit and a control circuit according to at least one embodiment of the present disclosure.

FIG. 6 is another working sequence diagram of a drive circuit and a control circuit according to at least one embodiment of the present disclosure. In some examples, as shown in FIG. 6, the first control line SW_A may provide a high-level signal so that the first control transistor M1 and the third control transistor M3 are turned off, the second control line SW_B may provide a low-level signal so that the second control transistor M2 and the fourth control transistor M4 are turned on, the first drive circuit 11 and the second drive circuit 12*a* may work independently, and the third drive circuit 13 and the second drive circuit 12*b* may work independently. The first start signal line STV_A may control a work of the first drive circuit 11, the third start signal line STV_B may control a work of the third drive circuit 13, and the second start signal line STV_C may control works of the second drive circuit 12*a* and the second drive circuit 12*b*. When a first start signal provided by the first start signal line STV_A and a third start signal provided by the third start signal line STV_B are the same, work states of the first drive circuit 11 and the third drive circuit 13 may be the same. In this example, frequency division display of three display partitions may be achieved, the first drive circuit 11, the second drive circuit 12*a*, the second drive circuit 12*b*, and the third drive circuit 13 may have independent work refresh frequencies, and the work refresh frequencies of the second drive circuit 12*a* and the second drive circuit 12*b* may be the same, so that the display refresh frequencies of the first partition A1, the second partition A2, and the third partition A3 can be independent of each other.

Figure 7:
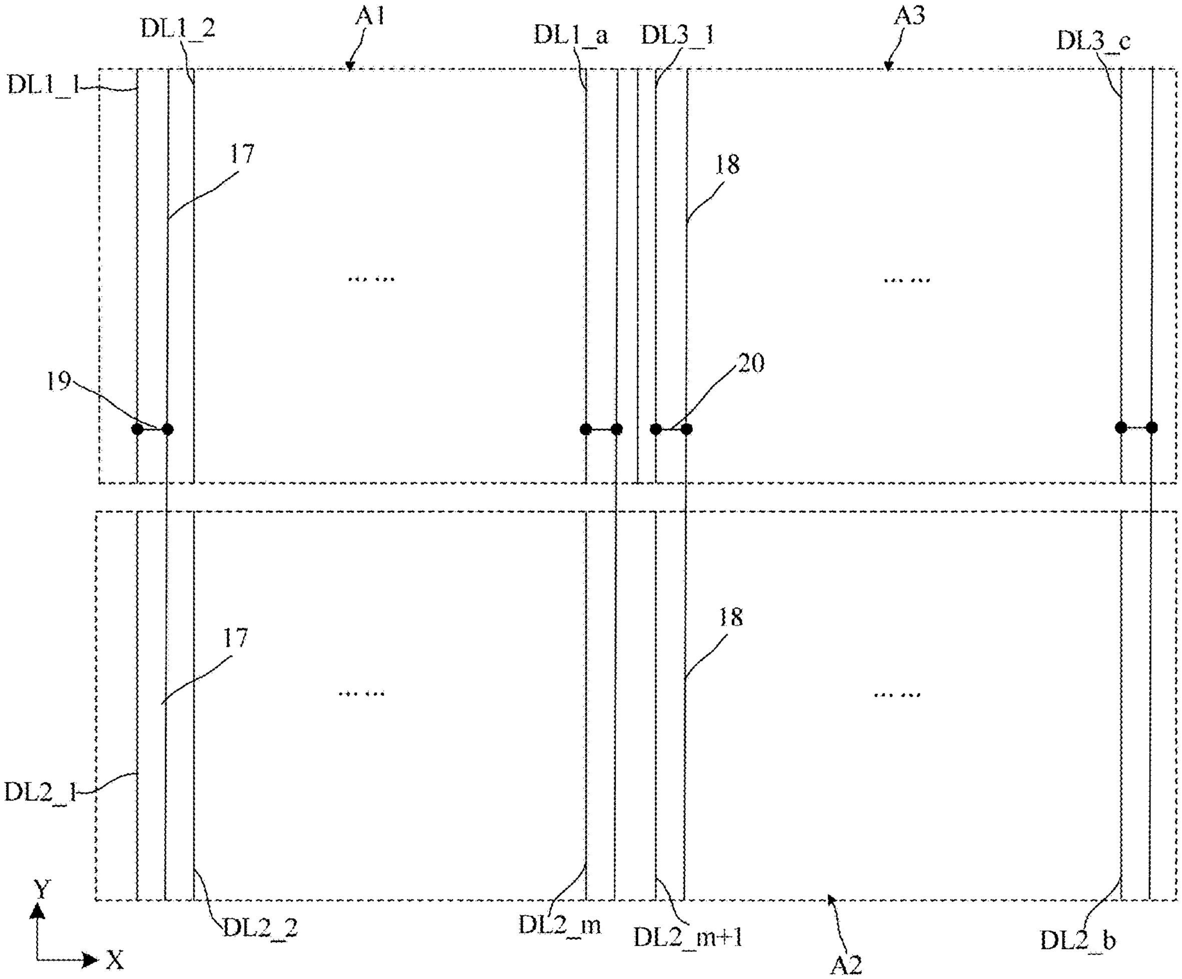
FIG. 7 is a schematic diagram of data lines of a display region according to at least one embodiment of the present disclosure.

FIG. 7 is a schematic diagram of data lines of a display region according to at least one embodiment of the present disclosure. In some examples, as shown in FIG. 7, the display region may include a plurality of data lines, for example, a plurality of first data lines (including, for example, first data lines DL1_1 to DL1_*a*) electrically connected with a plurality of sub-pixels in the first partition A1, a plurality of third data lines (including, for example, third data lines DL3_1 to DL3_*c*) electrically connected with a plurality of sub-pixels in the third partition A3, and a plurality of second data lines (including, for example, second data lines DL2_1 to DL2_*m*, DL2_*m*+1 to DL2_*b*) electrically connected with a plurality of sub-pixels in the second partition A2. Herein, a, b, c and m may be positive integers greater than 1. The plurality of first data lines, the plurality of second data lines, and the plurality of third data lines all extend along the second direction Y and are sequentially arranged along the first direction X. In some examples, a quantity of the first data lines and a quantity of the third data lines may be substantially the same, and a quantity of the second data lines may be a sum of the quantity of the first data lines and the quantity of the third data lines. However, the present embodiment is not limited thereto.

In some examples, as shown in FIG. 7, a first data line may be configured to provide a data signal to sub-pixel of the first partition A1, a second data line may be configured to provide a data signal to sub-pixel of the second partition A2, and a third data line may be configured to provide a data signal to sub-pixel of the third partition A3. The first data line, the second data line, and the third data line may be in a same layer. The first data line and the second data line aligned in the second direction Y may be disconnected at a junction of the first partition A1 and the second partition A2, and the second data line and third data line aligned in the second direction Y may be disconnected at a junction of the second partition A2 and the third partition A3.

In some examples, as shown in FIG. 7, the first partition A1 may further be provided with a plurality of first transfer lines 19 and a plurality of first data auxiliary lines 17, and extension directions of a first transfer line 19 may intersect with a first data auxiliary line 17. For example, the first data auxiliary line 17 may extend to the second partition A2 along the second direction Y and enter the lower bezel via the second partition A2 to achieve electrical connection with a drive chip located in the lower bezel. The first transfer line 19 may extend along the first direction X to achieve electrical connection between the first data line and the first data auxiliary line 17. In some examples, at least one first data auxiliary line 17 may be located between two adjacent second data lines in the second partition A2. However, the present embodiment is not limited thereto. For example, the plurality of first data auxiliary lines 17 may be concentratedly arranged.

In some examples, as shown in FIG. 7, the third partition A3 may further be provided with a plurality of second transfer lines 20 and a plurality of second data auxiliary lines 18, and extension directions of a second transfer line 20 may intersect with a second data auxiliary line 18. For example, the second data auxiliary line 18 may extend to the second partition A2 along the second direction Y and enter the lower bezel via the second partition A2 to achieve electrical connection with a driver chip located in the lower bezel. The second transfer line 20 may extend along the first direction X to achieve electrical connection between the third data line and the second data auxiliary line 18. In some examples, at least one second data auxiliary line 18 may be located between two adjacent second data lines in the second partition A2. However, the present embodiment is not limited thereto. For example, the plurality of second data auxiliary lines 18 and the plurality of first data auxiliary lines 17 may be concentratedly arranged.

In some examples, the first data line, the second data line, and the third data line may be in a same layer, the first transfer line and the second transfer line may be in a same layer, and the first data auxiliary line and the second data auxiliary line may be in a same layer. For example, the first data line and the first data auxiliary line may be in a same layer, and the first transfer line may be located on a side of the first data auxiliary line close to the base substrate. For another example, the first data line and the first data auxiliary line may be in a same layer, and the first transfer line may be located on a side of the first data auxiliary line away from the base substrate. For another example, the first data line and the first data auxiliary line may be in different layers. The present embodiment is not limited thereto.

Figure 8:
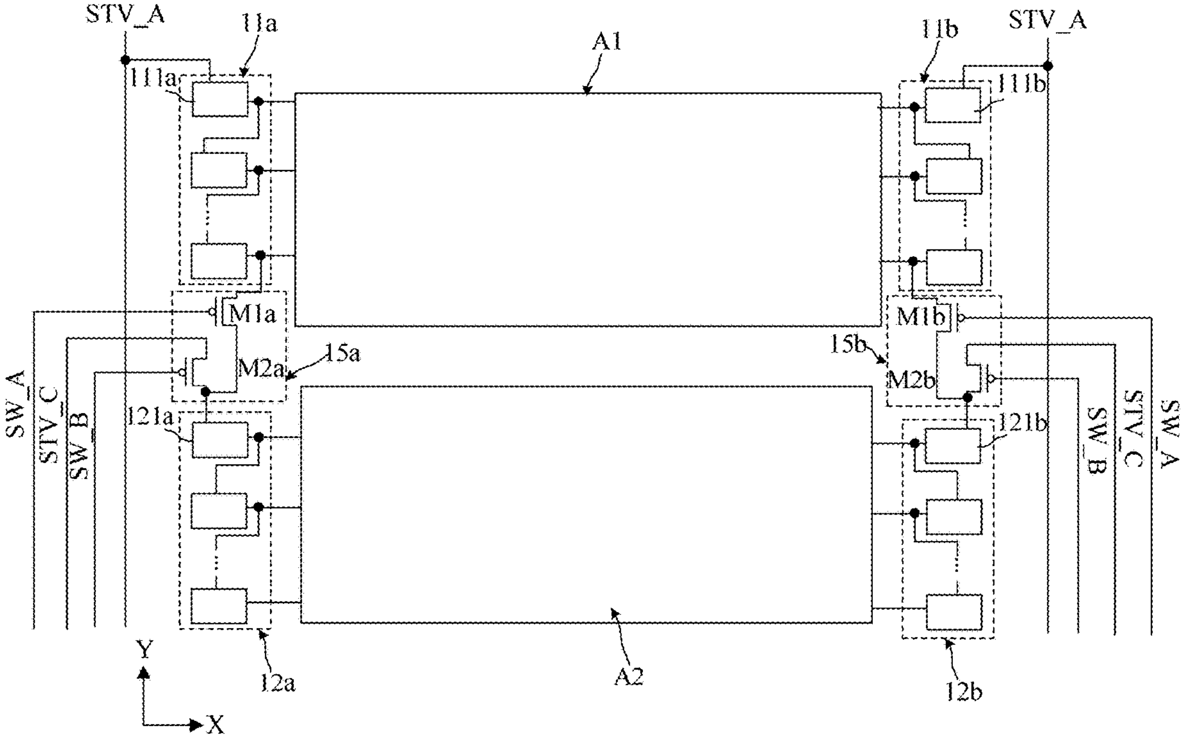
FIG. 8 is another partial schematic diagram of a display substrate according to at least one embodiment of the present disclosure.

FIG. 8 is another partial schematic diagram of a display substrate according to at least one embodiment of the present disclosure. In some examples, as shown in FIG. 8, a display region of the display substrate may include two display partitions (e.g., including a first partition A1 and a second partition A2). The first partition A1 and the second partition A2 are adjacent to each other in the second direction Y. A peripheral region of the display substrate may be provided with a plurality of drive circuits, including, for example, two first drive circuits 11*a* and 11*b* and two second drive circuits 12*a* and 12*b*. The two first drive circuits 11*a* and 11*b* may be provided on opposite sides of the first partition A1 along the first direction X, and the two second drive circuits 12*a* and 12*b* may be provided on opposite sides of the second partition A2 along the first direction X.

In some examples, as shown in FIG. 8, the first drive circuit 11*a* and the second drive circuit 12*a* may be electrically connected through a first control circuit 15*a*, and the first drive circuit 11*b* and the second drive circuit 12*b* may be electrically connected through a second control circuit 15*b*. The first control circuit 15*a* may include a first control transistor M1*a* and a second control transistor M2*a*. When the first control transistor M1*a* is turned on and the second control transistor M2*a* is turned off, an output terminal of a last-stage first scan drive unit 111*a* of the first drive circuit 11*a* may be electrically connected with an input terminal of a first-stage second scan drive unit 121*a* of the second drive circuit 12*a*. When the first control transistor M1*a* is turned off and the second control transistor M2*a* is turned on, the input terminal of the first-stage second scan drive unit 121*a* of the second drive circuit 12*a* is electrically connected with a second start signal line STV_C. The first control circuit 15*b* may include a first control transistor M1*b* and a second control transistor M2*b*, and the first control circuit 15*b* may be configured to control an input terminal of a first-stage second scan drive unit 121*b* of the second drive circuit 12*b* to be electrically connected with an output terminal of a last-stage first scan drive unit 111*b* of the first drive circuit 11*b* or to be electrically connected with a second start signal line STV_C.

In the present example, sub-pixels within the first partition A1 may be driven bilaterally by the first drive circuit 11*a* disposed in a left bezel and the first drive circuit 11*b* disposed in a right bezel; Sub-pixels within the second partition A2 may be driven bilaterally by the second drive circuit 12*a* disposed on the left bezel and the second drive circuit 12*b* disposed in the right bezel, thereby a display effect is ensured. Further, with a first control circuit, it is possible to independently control display refresh frequencies of the first partition A1 and the second partition A2.

Figure 9:
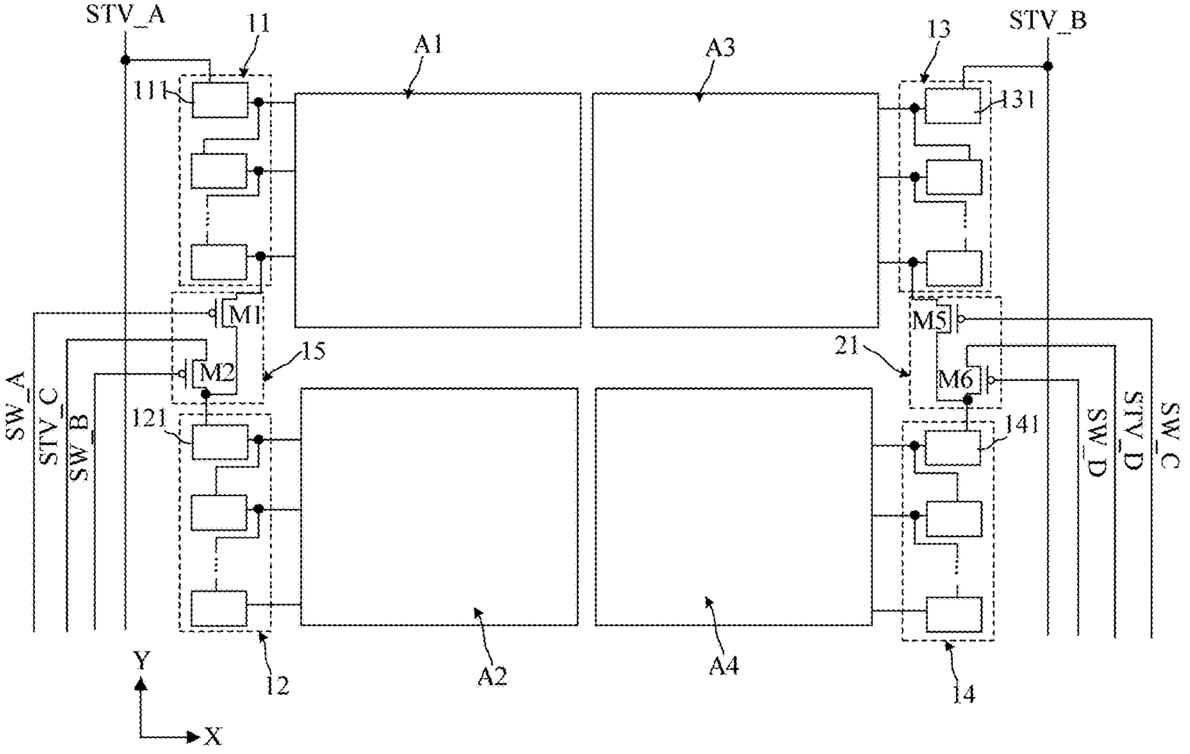
FIG. 9 is another partial schematic view of a display substrate according to at least one embodiment of the present disclosure.

FIG. 9 is another partial schematic diagram of a display substrate according to at least one embodiment of the present disclosure. In some examples, as shown in FIG. 9, a display region of the display substrate may include four display partitions (e.g., including a first partition A1, a second partition A2, a third partition A3, and a fourth partition A4). The first partition A1 and the second partition A2 are adjacent in the second direction Y, the first partition A1 and the third partition A3 are adjacent in the first direction X, the third partition A3 and the fourth partition A4 are adjacent in the second direction Y, and the fourth partition A4 and the second partition A2 are adjacent in the first direction X. A peripheral region of the display substrate may be provided with a plurality of drive circuits including, for example, a first drive circuit 11, a second drive circuit 12, a third drive circuit 13, and a fourth drive circuit 14. The first drive circuit 11 is provided on a side of the first partition A1 away from the third partition A3 in the first direction X, the second drive circuit 12 is provided on a side of the second partition A2 away from the fourth partition A4 in the first direction X, the third drive circuit 13 is provided on a side of the third partition A3 away from the first partition A1 in the first direction X, and the fourth drive circuit 14 is provided on a side of the fourth partition A4 away from the second partition A2 in the first direction X.

In some examples, as shown in FIG. 9, the first drive circuit 11 and the second drive circuit 12 may be electrically connected through a first control circuit 15, and the first control circuit 15 may be configured to control an input terminal of a first-stage second scan drive unit 121 of the second drive circuit 12 to be electrically connected with an output terminal of a last-stage first scan drive unit 111 of the first drive circuit 11 or to be electrically connected with a second start signal line STV_C. The third drive circuit 13 and the fourth drive circuit 14 may be electrically connected through a third control circuit 21, and the third control circuit 21 may be configured to control an input terminal of a first-stage fourth scan drive unit 141 of the fourth drive circuit 14 to be electrically connected with an output terminal of a last-stage third scan drive unit 131 of the third drive circuit 13, or to be electrically connected with a fourth start signal line STV_D.

In some examples, as shown in FIG. 9, the third control circuit 21 may include a fifth control transistor M5 and a sixth control transistor M6. A gate electrode of the fifth control transistor M5 is electrically connected with a third control line SW_C, a first electrode of the fifth control transistor M5 is electrically connected with the output terminal of the last-stage third scan drive unit 131 of the third drive circuit 13, and a second electrode of the fifth control transistor M5 is electrically connected with a second electrode of the sixth control transistor M6. A gate electrode of the sixth control transistor M6 is electrically connected with a fourth control line SW_D, a first electrode of the sixth control transistor M6 is electrically connected with the fourth start signal line STV_D, and the second electrode of the sixth control transistor M6 is electrically connected with the input terminal of the first-stage fourth scan drive unit 141 of the fourth drive circuit 14.

In this example, by using a first control circuit, display refresh frequencies of a first partition A1 and a second partition A2 may be independently controlled. By using a third control circuit, display refresh frequencies of a third partition A3 and a fourth partition A4 may be independently controlled.

Remaining structures of the present example may be referred to the description of the above embodiments and will not be repeated here.

In other examples, a drive circuit may include a plurality of cascaded light emitting control units that provide light emitting control signals to sub-pixels of a display region, and different drive circuits may be connected with the light emission control units through the control circuits as described above.

In other examples, a display region may be divided into three or more display partitions along the second direction Y, and the control circuits described above may be connected between drive circuits corresponding to adjacent display partitions to achieve independent control of display refresh frequencies for different partitions.

Hereinafter, a data line transfer mode of the display region will be described by way of an example.

Figure 10:
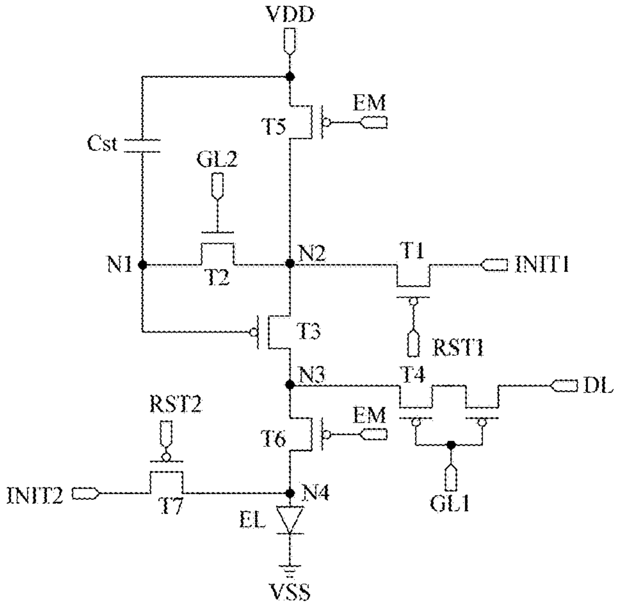
FIG. 10 is an equivalent circuit diagram of a pixel circuit according to at least one embodiment of the present disclosure.

FIG. 10 is an equivalent circuit diagram of a pixel circuit according to at least one embodiment of the present disclosure. In some examples, as shown in FIG. 10, a pixel circuit may include a first transistor T1 to a seventh transistor T7 and a storage capacitor Cst. A gate electrode of the first transistor T1 is coupled with a first reset control line RST1, a first electrode of the first transistor T1 is coupled with a first initial signal line INIT1, and a second electrode of the first transistor T1 is coupled with a second node N2. The first transistor T1 is configured to refresh the second node N2 with a first initial signal provided by the first initial signal line INIT1. A gate electrode of a second transistor T2 is coupled with a second scan line GL2, a first electrode of the second transistor T2 is coupled with a first node N1, and a second electrode of the second transistor T2 is coupled with the second node N2. The second transistor T2 is configured to connect the first node N1 and the second node N2 under a control of the second scan line GL2 to compensate a threshold voltage of a third transistor T3. A gate electrode of the third transistor T3 (i.e. a drive transistor) is coupled with the first node N1, a first electrode of the third transistor T3 is coupled with the second node N2, and a second electrode of the third transistor T3 is coupled with a third node N3. A gate electrode of a fourth transistor T4 is coupled with a first scan line GL1, a first electrode of the fourth transistor T4 is coupled with a data line DL, and a second electrode of the fourth transistor T4 is coupled with the third node N3. The fourth transistor T4 is configured to perform data writing. A gate electrode of a fifth transistor T5 is coupled with a light emitting control line EML1, a first electrode of the fifth transistor T5 is coupled with a first power supply line VDD, and a second electrode of the fifth transistor T5 is coupled with the second node N2. A gate electrode of a sixth transistor T6 is coupled with the light emitting control line EM, a first electrode of the sixth transistor T6 is coupled with the third node N3, and a second electrode of the sixth transistor T6 is coupled with a fourth node N4. A gate electrode of a seventh transistor T7 is coupled with a second reset control line RST2, a first electrode of the seventh transistor T7 is coupled with a second initial signal line INIT2, and a second electrode of the seventh reset transistor T7 is coupled with the fourth node N4. The seventh transistor T7 is configured to refresh the fourth node N4. A first plate of the storage capacitor Cst is electrically connected with the first node N1, and a second plate of the storage capacitor Cst is electrically connected with the first power supply line VDD. A first electrode of a light emitting element EL is coupled with the fourth node N4, and a second electrode of the light emitting element EL is coupled with a second power supply line VSS.

In some examples, the first transistor T1, and the third transistor T3 to the seventh transistor T7 may all be a P-type transistor, such as a low-temperature polysilicon thin film transistor may be adopted, and the second transistor T2 may be an N-type transistor, such as an oxide thin film transistor may be adopted. The transistor T4 may be a P-type transistor of a double gate structure. In this example, the fourth transistor T4 is made of a P-type transistor with a double-gate structure, and the second transistor is made of an oxide thin film transistor, which may prevent current leakage of the first node N1 from occurring, and is beneficial to low-frequency display.

In some examples, as shown in FIG. 10, the first node N1 is a connection point of the second transistor T2, the third transistor T3, and the storage capacitor Cst. The second node N2 is a connection point of the first transistor T1, the second transistor T2, the third transistor T3, and the fifth transistor T5. The third node N3 is a connection point of the third transistor T3, the fourth transistor T4, and the sixth transistor T6. The fourth node N4 is a connection point of the sixth transistor T6, the seventh transistor T7, and the light emitting element EL.

Figure 11:
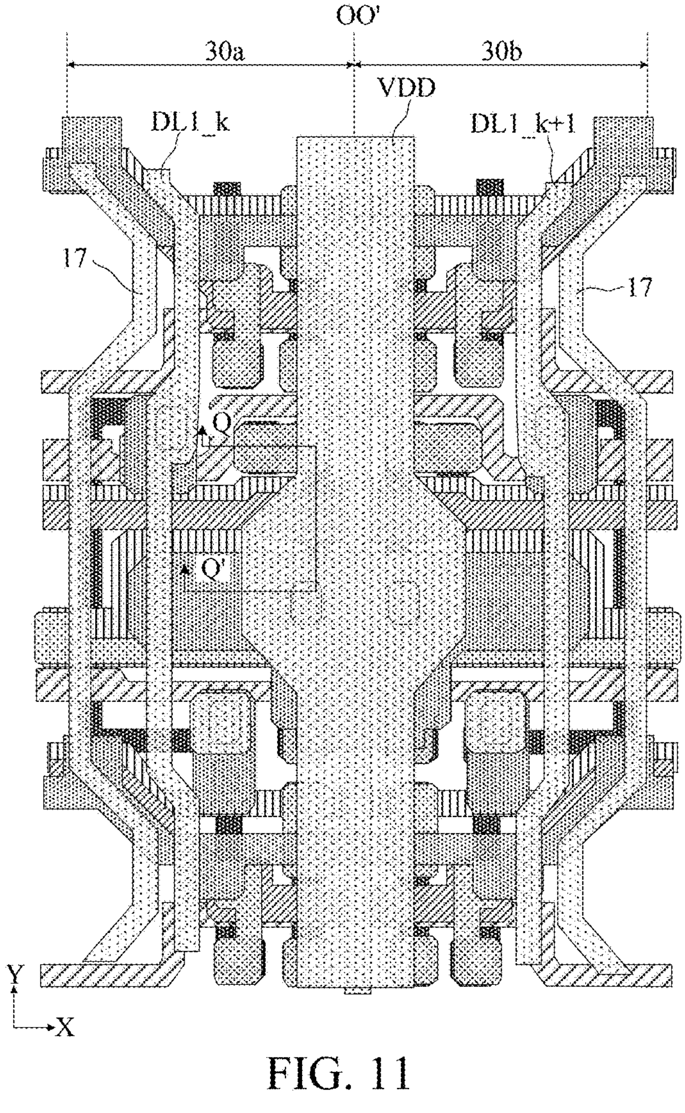
FIG. 11 is a schematic partial plan view of a display region of a display substrate according to at least one embodiment of the present disclosure.
Figure 12:
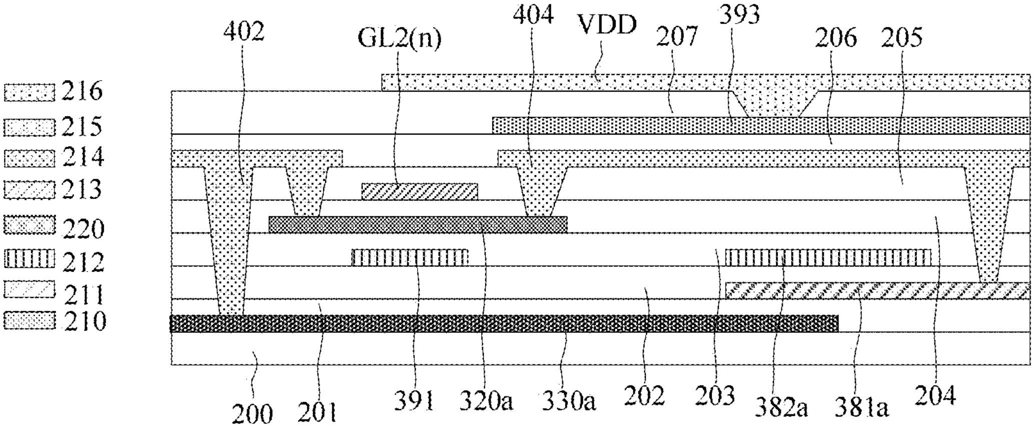
FIG. 12 is a schematic partial cross-sectional view along a direction Q-Q' in FIG. 11.

FIG. 11 is a schematic partial plan view of a display region of a display substrate according to at least one embodiment of the present disclosure. FIG. 11 is illustrated by taking a pixel circuit group (including two pixel circuits 30*a* and 30*b*) within a first partition of the display region of the display substrate as an example. FIG. 12 illustrates schematically a partial cross-sectional view along a direction Q-Q' in FIG. 11.

In some examples, as shown in FIG. 11, in a plane parallel to the display substrate, two pixel circuits 30*a* and 30*b* of one pixel circuit group may be sequentially arranged along a first direction X and symmetrically arranged with respect to a center line OO' of the pixel circuit group along the first direction X. The pixel circuit 30*a* may be electrically connected with a data line DL1_*k* and a first power supply line VDD, and the pixel circuit 30*b* may be electrically connected with a data line DL1_*k*+1 and the first power supply line VDD. The first data lines DL1_*k*, DL1_*k*+1 and the first power supply line VDD may be provided in a same layer, and the first power supply line VDD may be located between the first data line DL1_*k* and the first data line DL1_*k*+1. The first power supply line VDD may be symmetrical with respect to the center line OO', and the data lines DL1_*k* and the data line DL1_*k*+1 may be symmetrical with respect to the center line OO'. In this example, symmetrical arrangement of the pixel circuit is beneficial to reducing occupied space of pixel circuit, thereby achieving a high-resolution display substrate.

In embodiments of the present disclosure, "symmetrically" may refer to a case that a boundary is defined not so strictly and an approximately symmetrical disposition within a range of a process and measurement error is allowed.

In some examples, as shown in FIG. 12, in a direction perpendicular to the display substrate, the display region may include: a first semiconductor layer 210, a first conductive layer 211, a second conductive layer 212, a second semiconductor layer 220, a third conductive layer 213, a fourth conductive layer 214, a fifth conductive layer 215, and a sixth conductive layer 216 that are sequentially disposed on the base substrate 200. In some examples, the first conductive layer 211 may also be referred to as a first gate metal layer, the second conductive layer 212 may also be referred to as a second gate metal layer, the third conductive layer 213 may also be referred to as a third gate metal layer, the fourth conductive layer 214 may also be referred to as a first source-drain metal layer, and the fifth conductive layer 215 may also be referred to as a second source-drain metal layer, the sixth conductive layer 216 may also be referred to as a third source-drain metal layer. In some examples, a light emitting structure layer and an encapsulation structure layer may be sequentially disposed at a side of a pixel circuit away from the base substrate 200.

In some examples, as illustrated in FIG. 12, the display region may at least include a first insulation layer 201 to a seventh insulation layer 207. The first insulation layer 201 may be located between the first semiconductor layer 210 and the first conductive layer 211, the second insulation layer 202 may be located between the first conductive layer 211 and the second conductive layer 212, the third insulation layer 203 may be located between the second conductive layer 212 and the second semiconductor layer 220, the fourth insulation layer 204 may be located between the second semiconductor layer 220 and the third conductive layer 213, the fifth insulation layer 205 may be located between the third conductive layer 213 and the fourth conductive layer 214, the sixth insulation layer 206 may be located between the fourth conductive layer 214 and the fifth conductive layer 215, and the seventh insulation layer 207 may be located between the fifth conductive layer 215 and the sixth conductive layer 216. In some examples, the first insulation layer 201 to the fifth insulation layer 205 may be inorganic insulation layers, and the sixth insulation layer 206 and the seventh insulation layer 207 may be organic insulation layers. However, the present embodiment is not limited thereto.

Figure 13:
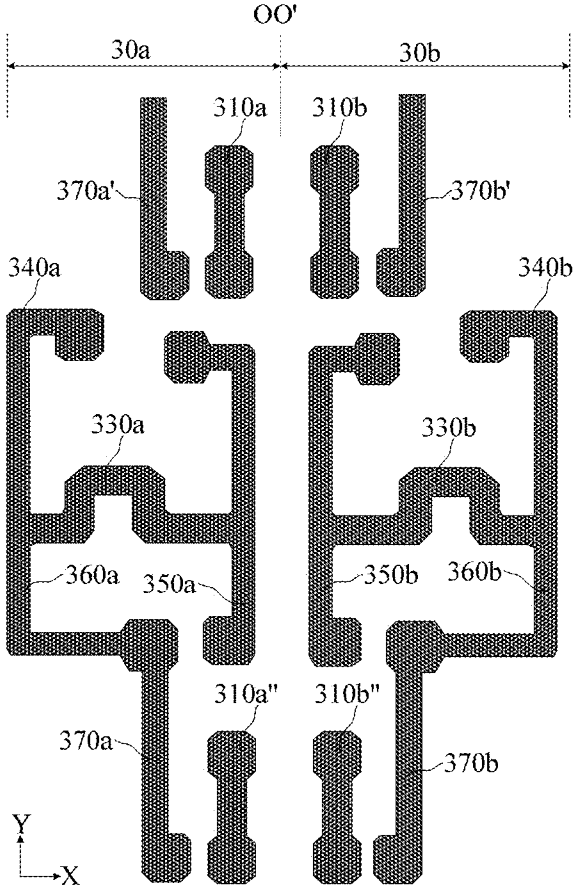
FIG. 13 is a schematic partial view of a display substrate after a first semiconductor layer is formed in FIG. 11.
Figure 14:
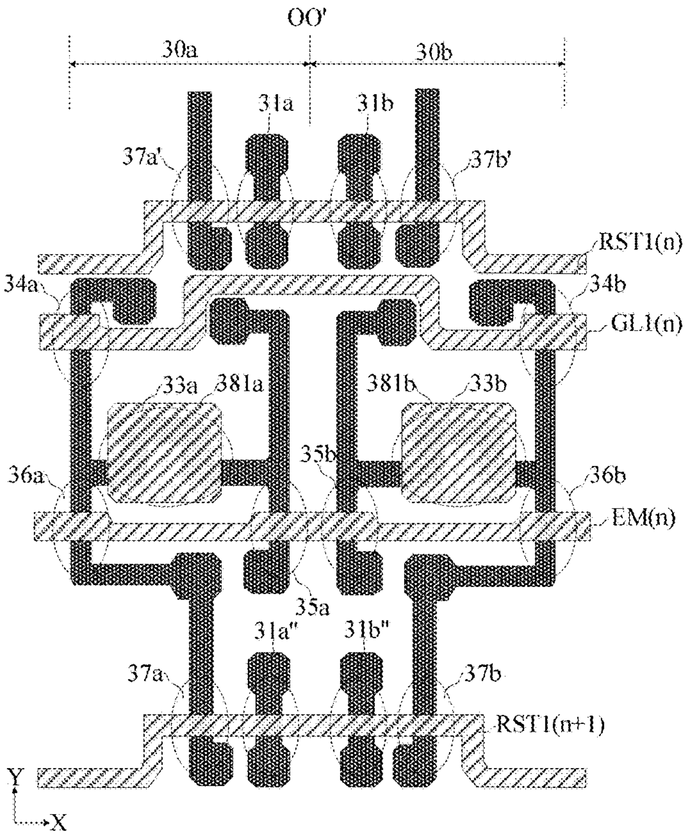
FIG. 14 is a schematic partial view of a display substrate after a first conductive layer is formed in FIG. 11.
Figure 15:
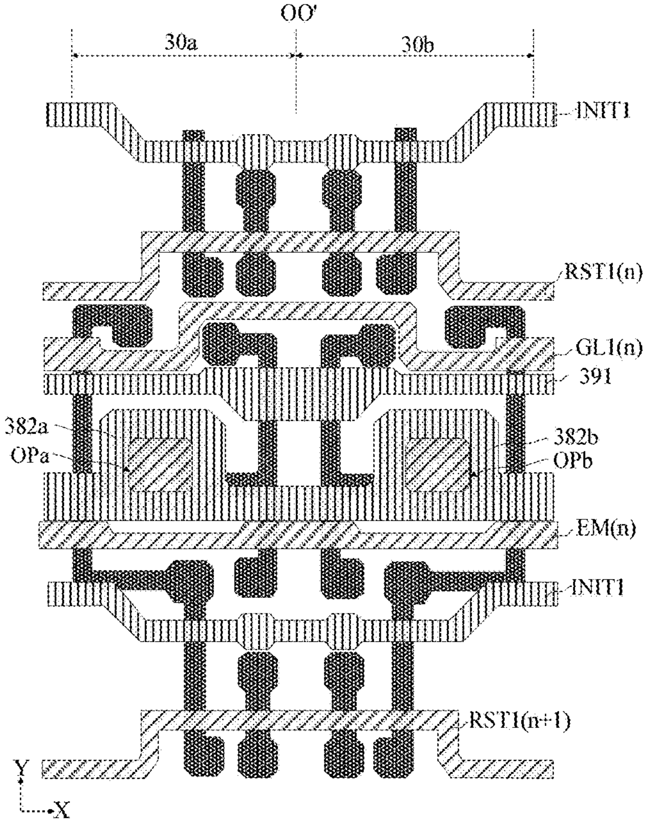
FIG. 15 is a schematic partial view of a display substrate after a second conductive layer is formed in FIG. 11.
Figure 16:
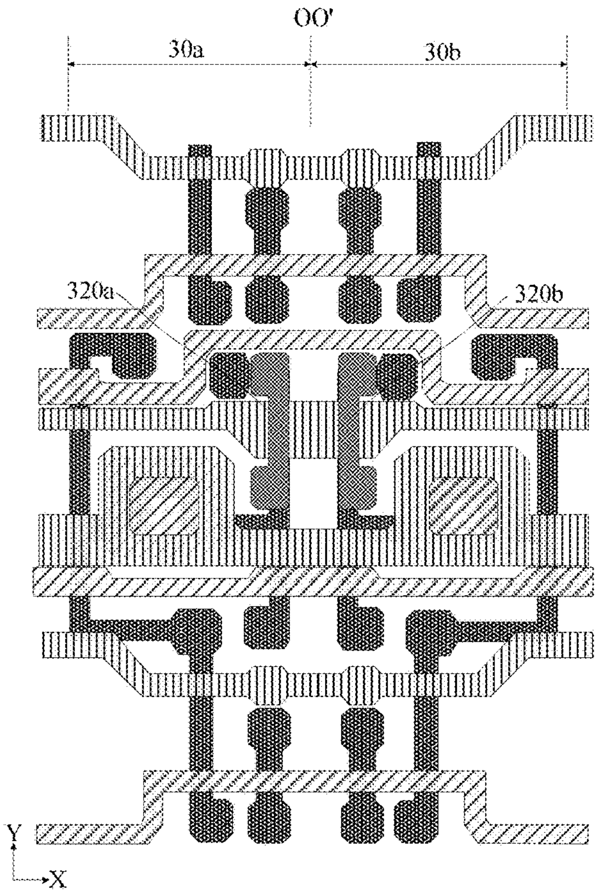
FIG. 16 is a schematic partial view of a display substrate after a second semiconductor layer is formed in FIG. 11.
Figure 17:
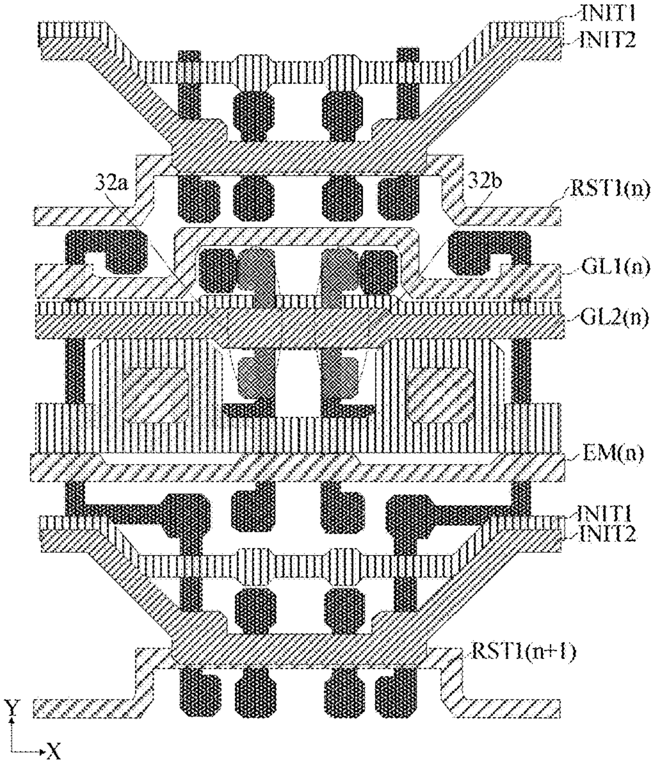
FIG. 17 is a schematic partial view of a display substrate after a third conductive layer is formed in FIG. 11.
Figure 18:
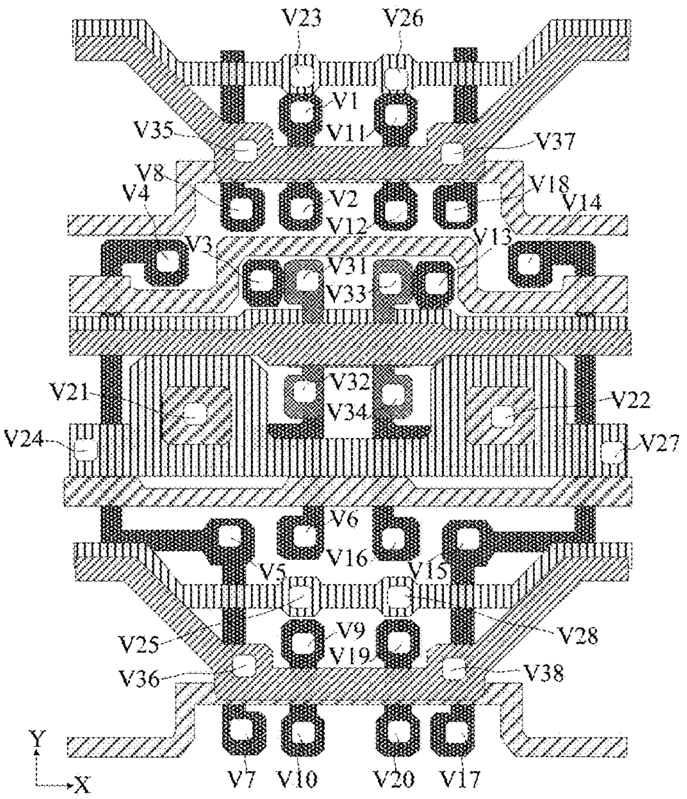
FIG. 18 is a schematic partial view of a display substrate after a fifth insulation layer is formed in FIG. 11.
Figure 19:
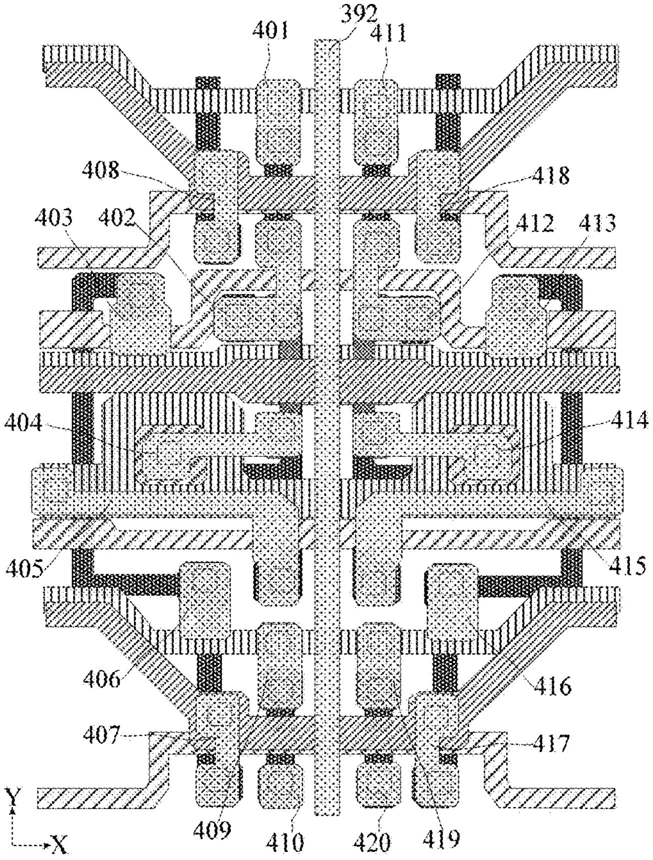
FIG. 19 is a schematic partial view of a display substrate after a fourth conductive layer is formed in FIG. 11.
Figure 20:
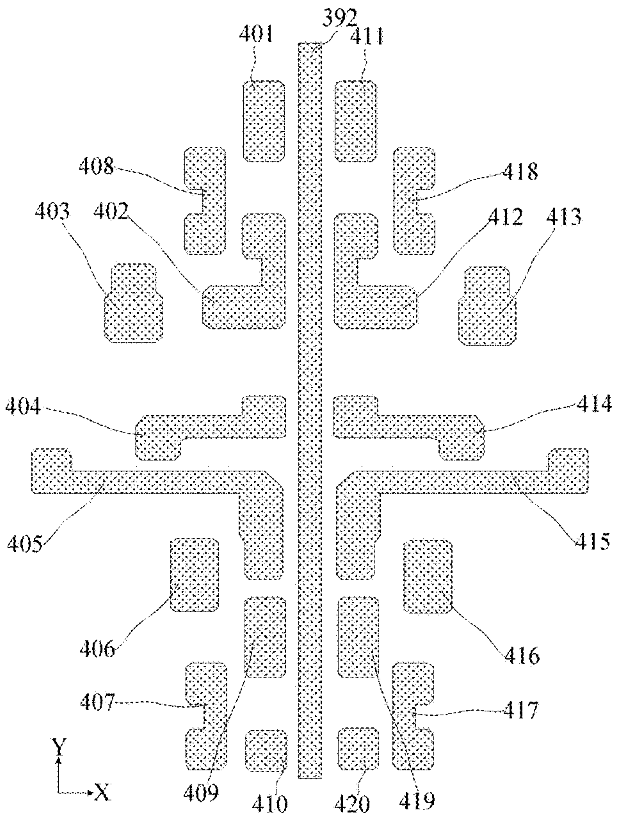
FIG. 20 is a schematic plan view of a fourth conductive layer in FIG. 19.
Figure 21:
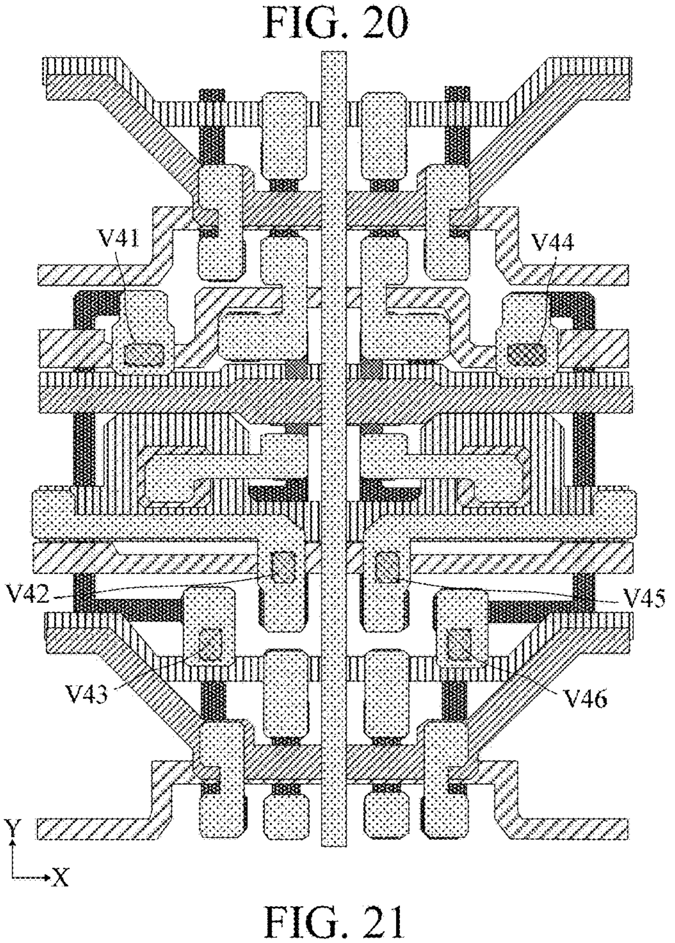
FIG. 21 is a schematic partial view of a display substrate after a sixth insulation layer is formed in FIG. 11.
Figure 22:
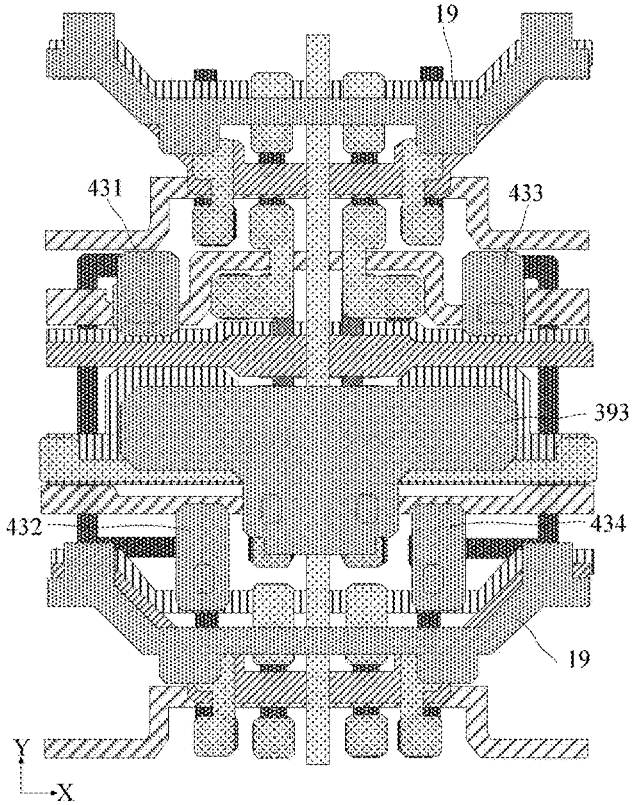
FIG. 22 is a schematic partial view of a display substrate after a fifth conductive layer is formed in FIG. 11.
Figure 23:
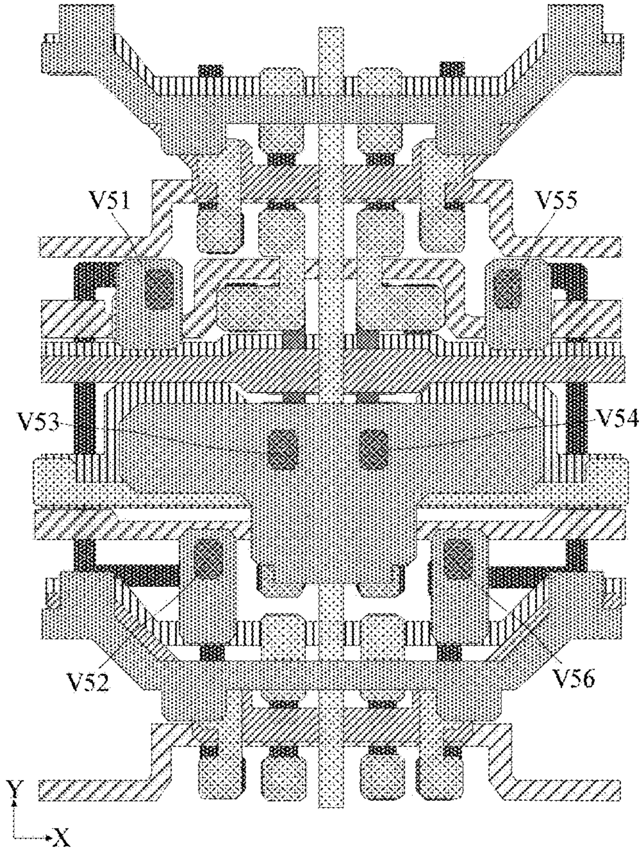
FIG. 23 is a schematic partial view of a display substrate after a seventh insulation layer is formed in FIG. 11.
Figure 24:
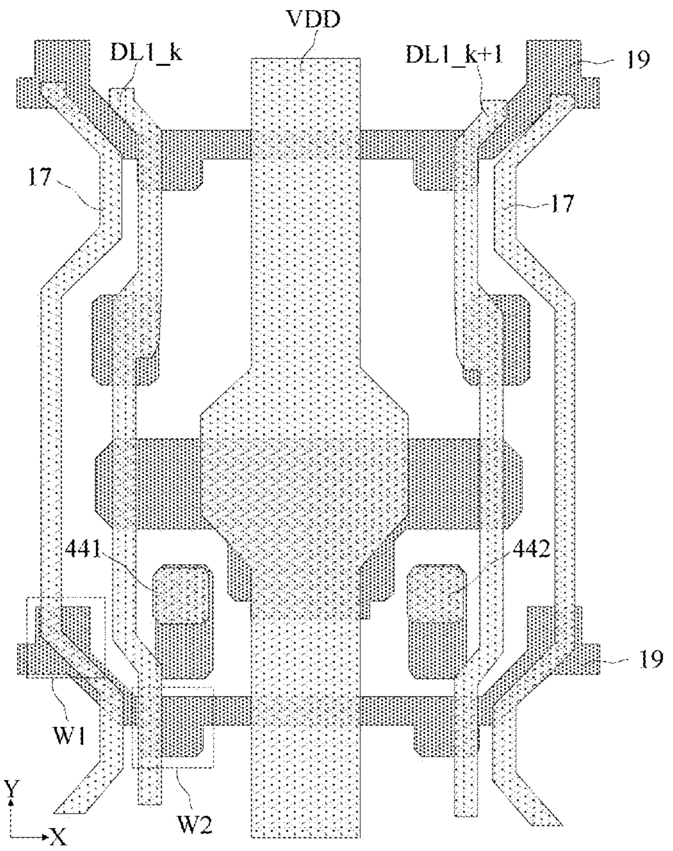
FIG. 24 is a schematic plan view of a fifth conductive layer and a sixth conductive layer in FIG. 11.

An exemplary description will be given for a structure and a manufacturing process of the display substrate below with reference to FIGS. 11 to 24. FIG. 13 is a schematic partial view of a display substrate after a first semiconductor layer is formed in FIG. 11. FIG. 14 is a schematic partial view of a display substrate after a first conductive layer is formed in FIG. 11. FIG. 15 is a schematic partial view of a display substrate after a second conductive layer is formed in FIG. 11. FIG. 16 is a schematic partial view of a display substrate after a second semiconductor layer is formed in FIG. 11. FIG. 17 is a schematic partial view of a display substrate after a third conductive layer is formed in FIG. 11. FIG. 18 is a schematic partial view of a display substrate after a fifth insulation layer is formed in FIG. 11. FIG. 19 is a schematic partial view of a display substrate after a fourth conductive layer is formed in FIG. 11. FIG. 20 is a schematic plan view of the fourth conductive layer in FIG. 19. FIG. 21 is a schematic partial view of a display substrate after a sixth insulation layer is formed in FIG. 11. FIG. 22 is a schematic partial view of a display substrate after a fifth conductive layer is formed in FIG. 11. FIG. 23 is a schematic partial view of a display substrate after a seventh insulation layer is formed in FIG. 11. FIG. 24 is a schematic plan view of a fifth conductive layer and a sixth conductive layer in FIG. 11.

A "patterning process" mentioned in the embodiments of the present disclosure includes a treatment such as photoresist coating, mask exposure, development, etching, and photoresist stripping for a metal material, an inorganic material, or a transparent conductive material, and includes a treatment such as organic material coating, mask exposure, and development for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film which is made of a material on an underlying substrate by using deposition, coating, or other processes. If the "thin film" does not need to be processed through a patterning process in the entire manufacturing process, the "thin film" may also be called a "layer". If the "thin film" needs to be processed through the patterning process in the entire manufacturing process, the "thin film" is called a "thin film" before the patterning process is performed and is called a "layer" after the patterning process is performed. At least one "pattern" is contained in the "layer" which has been processed through the patterning process. In an embodiment of the present disclosure, "an orthographic projection of B being within a range of an orthographic projection of A" or "an orthographic projection of A containing an orthographic projection of B" means that a boundary of the orthographic projection of B falls within a range of a boundary of the orthographic projection of A, or the boundary of the orthographic projection of A is overlapped with the boundary of the orthographic projection of B.

In some exemplary embodiments, a preparation process of the display substrate may include following operations. An equivalent circuit of a pixel circuit may be as shown in FIG. 10. The pixel circuit may at least include one first type transistor and at least one second type transistor. The transistor types of the first type transistor and the second type transistor may be different. For example, the first-type transistor may include a Low Temperature Poly-Silicon thin film transistor, and the second-type transistor may include an oxide thin film transistor. In this example, the second transistor T2 of the pixel circuit may be an oxide thin film transistor, and the rest of the transistors may be low temperature poly-silicon thin film transistors.

(1) A base substrate is provided. In some examples, the base substrate 200 may be a rigid substrate, or may be a flexible substrate. For example, the rigid substrate may include, but is not limited to, one or more of glass and quartz, and the flexible substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In some examples, the flexible base substrate may include a first flexible material layer, a first inorganic material layer, a semiconductor layer, a second flexible material layer, and a second inorganic material layer which are stacked. The first flexible material layer and the second flexible material layer may be made of Polyimide (PI), Polyethylene Terephthalate (PET) or a surface-treated polymer soft film, or the like; and the first inorganic material layer and the second inorganic material layer may be made of Silicon Nitride (SiNx) or Silicon Oxide (SiOx), etc., thereby improving water-resistance and oxygen-resistance of the base substrate. A material of the semiconductor layer may be amorphous silicon (a-si). The present embodiment is not limited thereto.

(2) A first semiconductor layer is formed. In some examples, a first semiconductor thin film is deposited on the base substrate, and the first semiconductor thin film is patterned through a patterning process to form the first semiconductor layer disposed on the base substrate. In some examples, the first semiconductor layer may be made of amorphous silicon (a-Si), polycrystalline silicon (p-Si), hexathiophene or polythiophene, or other materials.

In some examples, as shown in FIG. 13, the first semiconductor layer may at least include: active layers of a plurality of first type transistors of a pixel circuit 30*a* in a current row (e.g., including an active layer 310*a* of a first transistor, an active layer 330*a* of a third transistor, an active layer 350*a* of a fifth transistor, an active layer 360*a* of a sixth transistor, an active layer 340*a* of a fourth transistor, an active layer 370*a* of a seventh transistor), active layers of a plurality of first type transistors of a pixel circuit 30*b* in the current row (e.g., including an active layer 310*b* of a first transistor, an active layer 330*b* of a third transistor, an active layer 350*b* of a fifth transistor, an active layer 360*b* of a sixth transistor, an active layer 340*b* of a fourth transistor, an active layer 370*b* of a seventh transistor), active layers of a plurality of first type transistors of a pixel circuit 30*a* in an previous row (e.g., including an active layer 370*a*' of a seventh transistor), active layers of a plurality of first type transistors of a pixel circuit 30*b* in the previous row (e.g., including an active layer 370*b*' of a seventh transistor), active layers of a plurality of first type transistors of a pixel circuit 30*a* in a next row (e.g., including an active layer 310*a*" of a first transistor), active layers of a plurality of first type transistors of a pixel circuit 30*b* in the next row (e.g., including an active layer 310*b*" of a first transistor). In some examples, an active layer of each transistor of a pixel circuit may include: at least one channel region and a first region and a second region located on opposite sides of the channel region.

In some examples, as shown in FIG. 13, the active layer 310*a* of the first transistor of the pixel circuit 30*a* in a current row may be adjacent to the active layer 370*a*' of the seventh transistor of the pixel circuit 30*a* in the previous row in the first direction X, and the active layer 370*a* of the seventh transistor of the pixel circuit 30*a* in the current row may be adjacent to the active layer 310*a*" of the first transistor of the pixel circuit 30*a* in the next row in the first direction X. The active layer 330*a* of the third transistor, the active layer 340*a* of the fourth transistor, the active layer 350*a* of the fifth transistor, the active layer 360 of the sixth transistor, and the active layer 370*a* of the seventh transistor of the pixel circuit 30*a* may be of an integrated structure. For example, the active layer 310*a* of the first transistor may be substantially I-shaped. The active layer 330*a* of the third transistor may be substantially n-shaped, the active layer 360*a* of the sixth transistor may be substantially L-shaped, the active layer 340*a* of the fourth transistor may be substantially inverted L-shaped, the active layer 350*a* of the fifth transistor may be substantially I-shaped, and the active layer 370*a* of the seventh transistor may be substantially I-shaped. However, the present embodiment is not limited thereto. Structures of the active layers of the first type transistors of the pixel circuit 30*b* and the structures of the active layers of the first type transistors of the pixel circuit 30*a* may be approximately symmetrical with respect to a centerline OO', so the structures of the active layers of the pixel circuit 30*b* will not be repeated here.

(3) A first conductive layer is formed. In some examples, a first insulation thin film and a first conductive thin film are deposited sequentially on the base substrate on which the aforementioned structure is formed, and the first conductive thin film is patterned through a patterning process to form a first insulation layer and a first conductive layer disposed on the first insulation layer.

In some examples, after the first conductive layer is formed, the first conductive layer may be used as a shield to perform a conductive treatment on the first semiconductor layer. A region of the first semiconductor layer, which is shielded by the first conductive layer, forms channel regions of the plurality of transistors, and a region of the first semiconductor layer, which is not shielded by the first conductive layer, is made to be conductive, that is, all of the first regions and the second regions of the active layers of the first type transistors are made to be conductive.

In some examples, as shown in FIG. 14, the first conductive layer may at least include: a first reset control line RST1 (*n*) and a first reset control line RST1 (n+1), a first scan line GL1 (*n*), a light emitting control line EM (n), a first plate 381*a* of a storage capacitor of the pixel circuit 30*a* and gate electrodes of the plurality of first-type transistors (including, for example, a gate electrode of the first transistor 31*a*, a gate electrode of the third transistor 33*a*, a gate electrode of the fifth transistor 35*a*, a gate electrode of the sixth transistor 36*a*, a gate electrode of the fourth transistor 34*a* of a pixel circuit 30*a* in a current row, and a gate electrode of the seventh transistor 37*a*' of the pixel circuit 30*a* in a previous row), a first plate 381*b* of a storage capacitor of the pixel circuit 30*b*, and gate electrodes of a plurality of first type transistors (including, for example, a gate electrode of the first transistor 31*b*, a gate electrode of the third transistor 33*b*, a gate electrode of the fifth transistor 35*b*, a gate electrode of the sixth transistor 36*b*, a gate electrode of the fourth transistor 34*b* of the pixel circuit 30*b* in the current row, and a gate electrode of the seventh transistor 37*b*' of the pixel circuit 30*b* in a previous row).

In some examples, as shown in FIG. 14, the first reset control line RST1 (*n*) and the first reset control line RST1 (*n*), the first scan line GL1 (*n*), and the light emitting control line EM (n) may all extend in the first direction X. The first scan line GL1 (*n*) may be located on a side of a gate electrode of a third transistor away from the light emitting control line EM (n) in the second direction Y.

In some examples, as shown in FIG. 14, the first plate 381*a* of the storage capacitor of the pixel circuit 30*a* and the gate electrode of the third transistor 33*a* may be of an integrated structure. The gate electrode of the first transistor 31*a* of the pixel circuit 30*a* in the current row, the gate electrode of the seventh transistor 37*a*' of the pixel circuit 30*a* in the previous row, the gate electrode of the first transistor 31*b* of the pixel circuit 30*b* in the current row and the gate of the seventh transistor 37*b*' of the pixel circuit 30*b* in the previous row, and the first reset control line RST1 (*i*) may be of an integrated structure. The gate electrode of the fifth transistor 35*a* and the gate electrode of the sixth transistor 36*a* of the pixel circuit 30*a* in the current row, the gate electrode of the fifth transistor 35*b* and the gate electrode of the sixth transistor 36*b* of the pixel circuit 30*b* in the current row, and the light emitting control line EM (n) may be of an integrated structure. The gate electrode of the fourth transistor 34*a* of the pixel circuit 30*a* in the current row, the gate electrode of the fourth transistor 34*b* of the pixel circuit 30*b* in the current row, and the first scan line GL1(*n*) may be of an integrated structure. The gate electrode of the seventh transistor 37*a* of the pixel circuit 30*a* in the current row, the gate electrode of the first transistor 31*a*" of the pixel circuit 30*a* in the next row, the gate electrode of the seventh transistor 37*b* of the pixel circuit 30*b* in the current row and the gate electrode of the first transistor 31*b*" of the pixel circuit 30*b* in the next row, and the first reset control line RST1 (n+1) may be of an integrated structure.

(4) A second conductive layer is formed. In some examples, a second insulation thin film and a second conductive thin film are deposited sequentially on the base substrate on which the aforementioned structures are formed, and the second conductive thin film is patterned through a patterning process to form a second insulation layer and a second conductive layer disposed on the second insulation layer.

In some examples, as shown in FIG. 15, the second conductive layer may at least include a second plate 382*a* of the storage capacitor of the pixel circuit 30*a*, a second plate 382*b* of the storage capacitor of the pixel circuit 30*b* and a scan auxiliary line 391. The scan auxiliary line 391 may extend along the first direction X, and an orthographic projection of the scan auxiliary line 391 on the base substrate may be located at a side of an orthographic projection of the first reset control line RST1 (*n*) on the base substrate close to the gate electrode of the third transistor.

In some examples, as shown in FIGS. 14 and 15, orthographic projections of the first plate 381*a* and the second plate 382*a* of the storage capacitor of the pixel circuit 30*a* on the base substrate may be overlapped. The second plate 382*a* may have a hollow region OPa, and an orthographic projection of the hollow region OPa on the base substrate may be within a range of the orthographic projection of the first plate 381*a* on the base substrate. Orthographic projections of the first plate 381*b* and the second plate 382*b* of the storage capacitor of the pixel circuit 30*b* on the base substrate may be overlapped. The second plate 382*b* may have a hollow region OPb, an orthographic projection of the hollow region OPb on the base substrate may be within a range of the orthographic projection of the first plate 381*b* on the base substrate.

(5) A second semiconductor layer is formed. In some examples, a third insulation thin film and a second semiconductor thin film are sequentially deposited on the base substrate on which the aforementioned structures are formed, and the second semiconductor thin film is patterned through a patterning process to form a third insulation layer and a second semiconductor layer disposed on the third insulation layer. In some examples, a material of the second semiconductor layer may include indium gallium zinc oxide (IGZO).

In some examples, as shown in FIG. 16, the second semiconductor layer may at least include an active layer of a second type transistor of the pixel circuit 30*a* (e.g. including an active layer 320*a* of the second transistor), an active layer of a second type transistor of the pixel circuit 30*b* (e.g. including an active layer 320*b* of the second transistor). The active layer 320*a* of the second transistor of the pixel circuit 30*a* may be located at a side of the active layer of the fourth transistor 34*a* close to the centerline OO' in the first direction X, and the active layer 320*b* of the second transistor of the pixel circuit 30*b* may be located at a side of the active layer of the fourth transistor 34*b* close to the centerline OO' in the first direction X. Orthographic projections of the active layer 320*a* and the active layer 320*b* of the second transistor of the pixel circuit on the base substrate may be approximately I-shaped.

In some examples, as shown in FIG. 16, the orthographic projection of the scan auxiliary line 391 on the base substrate may be overlapped with orthographic projections of the active layer 320*a* of the second transistor and the active layer 320*b* of the second transistor on the base substrate. The scan auxiliary line 391 may be used as a bottom gate of the second transistor and may also shield light for a channel region of the second transistor to avoid affecting performance of the second transistor.

(6) A third conductive layer is formed. In some examples, a fourth insulation thin film and a third conductive thin film are sequentially deposited on the base substrate on which the aforementioned patterns are formed, and the third conductive thin film is patterned through a patterning process to form a fourth insulation layer and a third conductive layer disposed on the fourth insulation layer.

In some examples, as shown in FIG. 17, the third conductive layer may at least include a gate electrode of a second type transistor of the pixel circuit 30*a* (e.g. including a gate electrode of a second transistor 32*a*), a gate electrode of a second type transistor of the pixel circuit 30*b* (e.g. including a gate electrode of the second transistor 32*b*), a second scan line GL2 (*n*), and a second initial signal line INIT2. The second initial signal line INIT2 may extend at least along the first direction X. The second scan line GL2 (*n*) may extend along the first direction X, and an orthographic projection of the second scan line GL2 (*n*) on the base substrate and the orthographic projection of the scan auxiliary line 391 on the base substrate may be overlapped. A gate electrode of the second transistor 32*a* of the pixel circuit 30*a* in the current row, a gate electrode of the second transistor 32*b* of the pixel circuit 30*b* in the current row, and the second scan line GL2 (*n*) may be of an integrated structure. For example, the second scan line GL2 (*n*) and the scan auxiliary line 391 may be configured to transmit a second scan signal. The second scan line GL2 (*n*) and the scan auxiliary line 391 may be electrically connected in a peripheral region. However, the present embodiment is not limited thereto.

(7) A fifth insulation layer is formed. In some examples, a sixth insulation thin film is deposited on the base substrate on which the aforementioned patterns are formed, and the fifth insulation thin film is patterned through a patterning process to form a fifth insulation layer.

In some examples, as shown in FIG. 18, the fifth insulation layer may be provided with a plurality of vias, and may include, for example, first type vias exposing a surface of the first semiconductor layer (e.g. including a first via V1 to a twentieth via V20), second type vias exposing a surface of the first conductive layer (e.g. including a twenty-first via V21 and a twenty-second via V22), third type vias exposing a surface of the second conductive layer (e.g. including a twenty-third via V23 to a twenty-eighth via V28), fourth type vias exposing a surface of the second conductive layer (e.g. including a thirty-first via V31 to a thirty-fourth via V34), and fifth type vias exposing a surface of the third conductive layer (e.g. including a thirty-fifth via V35 to a thirty-eighth via V38). For example, the fourth type vias and the fifth type vias may be formed by a same patterning process, and the first type vias, the second type vias, and the third type vias may be formed by a same patterning process. The present embodiment is not limited thereto.

(8) A fourth conductive layer is formed. In some examples, a fourth conductive thin film is deposited on the base substrate on which the aforementioned patterns are formed, and the fourth insulation thin film is patterned through a patterning process to form a fourth conductive layer on the fifth insulation layer.

In some examples, as shown in FIGS. 19 and 20, the fourth conductive layer may at least include a plurality of connection electrodes (including, for example, a first connection electrode 401 to a twentieth connection electrode 420), and an initial auxiliary line 392. The initial auxiliary line 392 may be located between the pixel circuit 30*a* and the pixel circuit 30*b*, e.g., is overlapped with the centerline OO'. The initial auxiliary line 392 may extend along the second direction Y. The initial auxiliary line 392 may be electrically connected with the first initial signal line INIT1 located in the first conductive layer to achieve mesh transmission of the first initial signal in the display region and improve uniformity of the first initial signal. In other examples, the initial auxiliary line may be electrically connected with the second initial signal line located in the second conductive layer to achieve mesh transmission of the second initial signal in the display region and improve uniformity of the second initial signal.

In some examples, as shown in FIGS. 13 to 20, the first connection electrode 401 may be electrically connected with a first region of the first active layer 310*a* of the first transistor 31*a* of the pixel circuit 30*a* through the first via V1, and may be electrically connected with the first initial signal line INIT1 through the thirty-third via V23. The second connection electrode 402 may be electrically connected with a second region of the active layer 310*a* of the first transistor 31*a* of the pixel circuit 30*a* through the second via V2, may be electrically connected with a second region of the active layer 330*a* of the third transistor 33*a* of the pixel circuit 30*a* through the third via V3, and may be electrically connected with a second region of the active layer 320*a* of the second transistor 32*a* through the thirty-first via V31. The third connection electrode 403 may be electrically connected with a first region of the active layer 340*a* of the fourth transistor 34*a* of the pixel circuit 30*a* through the fourth via V4. The fourth connection electrode 404 may be electrically connected with a first region of the active layer 320*a* of the second transistor 32*a* of the pixel circuit 30*a* through the thirty-second via V32, and may be electrically connected with the gate electrode of the third transistor 33*a* through the twenty-first via V21. The fifth connection electrode 405 may be electrically connected with the second plate 382*a* of the storage capacitor of the pixel circuit 30*a* through the twenty-fourth via V24, and may be electrically connected with a first region of the active layer 350*a* of the fifth transistor 35*a* through the sixth via V6. The sixth connection electrode 406 may be electrically connected with a second region of the active layer 360*a* of the sixth transistor 36*a* of the pixel circuit 30*a* through the fifth via V5. The seventh connection electrode 407 may be electrically connected with a first region of the active layer 370*a* of the seventh transistor 37*a* of the pixel circuit 30*a* through the seventh via V7, and may be electrically connected with the second initial signal line INIT2 through the thirty-sixth via V36. The eighth connection electrode 408 may be electrically connected with a first region of the active layer 370*a*' of the seventh transistor 37*a*' of the pixel circuit 30*a* in the previous row through the eighth via V8, and may be electrically connected with another second initial signal line INIT2 through the thirty-fifth via V35. The ninth connection electrode 409 may be electrically connected with a first region of the active layer 310*a*" of the first transistor 31*a*" of the pixel circuit 30*a* in the next row through the ninth via V9, and may be electrically connected with another first initial signal line INIT1 through the twenty-fifth via V25. The tenth connection electrode 410 may be electrically connected with a second region of the active layer 310*a*" of the first transistor 31*a*" of pixel circuit 30*a* in the next row through the tenth via V10.

In some examples, as shown in FIGS. 13 to 20, the eleventh connection electrode 411 may be electrically connected with a first region of the active layer 310*b* of the first transistor 31*b* of the pixel circuit 30*b* through the eleventh via V11, and may be electrically connected with the first initial signal line INIT1 through the twenty-sixth via V26. The twelfth connection electrode 412 may be electrically connected with a second region of the active layer 310*b* of the first transistor 31*b* of the pixel circuit 30*b* through the twelfth via V12, may be electrically connected with a second region of the active layer 330*b* of the third transistor 33*b* of the pixel circuit 30*b* through the thirteenth via V13, and may be electrically connected with a second region of the active layer 320*b* of the second transistor 32*b* through the thirty-third via V33. The thirteenth connection electrode 413 may be electrically connected with a first region of the active layer 340*b* of the fourth transistor 34*b* of the pixel circuit 30*b* through the fourteenth via V14. The fourteenth connection electrode 414 may be electrically connected with a first region of the active layer 320*b* of the second transistor 32*b* of the pixel circuit 30*b* through the thirty-fourth via V34, and may be electrically connected with the gate electrode of the third transistor 33*b* through the twenty-second via V22. The fifteenth connection electrode 415 may be electrically connected with the second plate 382*b* of the storage capacitor of the pixel circuit 30*b* through the twenty-seventh via V27, and may be electrically connected with a first region of the active layer 350*b* of the fifth transistor 35*b* through the sixteenth via V16. The sixteenth connection electrode 416 may be electrically connected with the second region of the active layer 360*b* of the sixth transistor 36*b* of the pixel circuit 30*b* through the fifteenth via V15. The seventeenth connection electrode 417 may be electrically connected with a first region of the active layer 370*b* of the seventh transistor 37*b* of the pixel circuit 30*b* through the seventeenth via V17, and may be electrically connected with the second initial signal line INIT2 through the thirty-eighth via V38. The eighteenth connection electrode 418 may be electrically connected with a first region of the active layer 370*b*' of the seventh transistor 37*b*' of the pixel circuit 30*b* in the previous row through the eighteenth via V18, and may be electrically connected with another second initial signal line INIT2 through the thirty-seventh via V37. The nineteenth connection electrode 419 may be electrically connected with a first region of the active layer 310*b*" of the first transistor 31*b*" of pixel circuit 30*b* in the next row through the nineteenth via V19, and may be electrically connected with another first initial signal line INIT1 through the twenty-eighth via V28. The twentieth connection electrode 420 may be electrically connected with a second region of the active layer 310*b*" of the first transistor 31*b*" of pixel circuit 30*b* in the next row through the twentieth via V20.

(9) A sixth insulation layer is formed. In some examples, a sixth insulation thin film is coated on the base substrate on which the aforementioned patterns are formed, and the sixth insulation thin film is patterned through a patterning process to form a sixth insulation layer.

In some examples, as shown in FIG. 21, the sixth insulation layer may be provided with a plurality of vias, for example, which may include a forty-first via V41 to a forty-eighth via V46. The sixth insulation layer within the forty-first via V41 to the forty-sixth via V46 may be removed, exposing at least a part of a surface of the fourth conductive layer.

(10) A fifth conductive layer is formed. In some examples, a fifth conductive thin film is deposited on the base substrate on which the aforementioned patterns are formed, and the fifth conductive thin film is patterned through a patterning process to form a fifth conductive layer on the sixth insulation layer.

In some examples, as shown in FIG. 22, the fifth conductive layer may include a first transfer line 19, a plurality of connection electrodes (including, for example, a thirty-first connection electrode 431 to a thirty-fourth connection electrode 434), and a power supply auxiliary electrode 393. The first transfer line 19 may extend at least along the first direction X. The first transfer line 19 may be located at a boundary of two adjacent rows of pixel circuits. The power supply auxiliary electrode 393 may be electrically connected with the fifth connection electrode 405 through the forty-second via V42, and may be electrically connected with the fifteenth connection electrode 415 through the forty-fifth via V45. An orthographic projection of the power supply auxiliary electrode 393 on the base substrate may cover orthographic projections of the fourth connection electrode 404 and the fourteenth connection electrode 414 on the base substrate, achieving covering the first nodes of the pixel circuits 30*a* and 30*b*, thereby avoiding interference of other surrounding signals on the first nodes of the pixel circuits.

(11) A seventh insulation layer is formed. In some examples, a seventh insulation thin film is coated on the base substrate on which the aforementioned patterns are formed, and the seventh insulation thin film is patterned through a patterning process to form a seventh insulation layer.

In some examples, as shown in FIG. 23, the seventh insulation layer may be provided with a plurality of vias, for example, which may include a fifty-first via V51 to a fifty-sixth via V56. The seventh insulation layer within the fifty-first via V51 to the fifty-sixth via V56 may be removed, exposing at least a part of a surface of the fifth conductive layer.

(12) A sixth conductive layer is formed. In some examples, a sixth conductive thin film is deposited on the base substrate on which the aforementioned patterns are formed, and the sixth conductive thin film is patterned through a patterning process to form a sixth conductive layer on the seventh insulation layer.

In some examples, as shown in FIG. 11 and FIG. 24, the sixth conductive layer may include a first power supply line VDD, first data lines DL1_*k* and DL1_*k*+1, a first data auxiliary line 17, a first anode connection electrode 441, and a second anode connection electrode 442. The first power supply line VDD, the first data lines DL1_*k* and DL1_*k*+1, and the first data auxiliary line 17 may all extend along the second direction Y. In the first direction X, the first power supply line VDD may be located between the two first data lines DL1_*k* and DL1_*k*+1, and the first data auxiliary line 17 may be located on a side of the first data line away from the first power supply line VDD. The first data lines DL1_*k* and DL1_*k*+1 may be substantially symmetrical with respect to the centerline OO ', and the first power supply line VDD may be substantially symmetrical with respect to the centerline OO'. In this example, the data lines are disposed in the sixth conductive layer, which can reduce a parasitic capacitance between the data signal and other line signals.

In some examples, as shown in FIG. 11, and FIG. 20 to FIG. 22, the first data line DL1_*k* may be electrically connected with the thirty-first connection electrode 431 through the fifty-first via V51 to achieve an electrical connection with the first region of the active layer 340*a* of the fourth transistor 34*a* of the pixel circuit 30*a*. The first data line DL1_*k*+1 may be electrically connected with the thirty-third connection electrode 433 through the fifty-fifth via V55, thereby achieving an electrical connection with the fourth transistor 34*b* of the pixel circuit 30*b*. The first power supply line VDD may be electrically connected with the power supply auxiliary electrode 393 through the fifty-third via V53 and the fifty-fourth via V54. The first anode connection electrode 441 may be electrically connected with the thirty-second connection electrode 432 through the fifty-second via V52, thereby achieving an electrical connection with the sixth transistor 36*a* of the pixel circuit 30*a*. The second anode connection electrode 442 may be electrically connected with the thirty-fourth connection electrode 434 through the fifty-sixth via V56, thereby achieving an electrical connection with the sixth transistor 36*b* of the pixel circuit 30*b*.

In some examples, as shown in FIG. 24, the first data line may be electrically connected with the first transfer line 19 at a second connection position W2, and the first transfer line 19 may be electrically connected with the first data auxiliary line 17 at a first connection position W1. For example, the first transfer line 19 may be electrically connected with the first data line and a corresponding first data auxiliary line 17 through a via provided in the seventh insulation layer. In some examples, each column of pixel circuits may be provided with one first data auxiliary line or one second data auxiliary line correspondingly. However, the present embodiment is not limited thereto.

In some examples, as shown in FIG. 22, an orthographic projection of the first transfer line 19 on the base substrate may be overlapped with an orthographic projection of a second initial signal line INIT2 of the third conductive layer on the base substrate. A line pattern of the first transfer line 19 may be similar to a line pattern of the second initial signal line INIT2. The first transfer line 19 of the present example is disposed in the fifth conductive layer and is located on the second initial signal line INIT2, and a parasitic capacitance can be reduced, thereby reducing the parasitic capacitance of the data lines as a whole. However, the present embodiment is not limited thereto. In other examples, the first transfer line 19 may be located in other film layers. For example, a Light-Shielding (LS) layer may be provided on a side of the first semiconductor layer close to the base substrate, and the first transfer line may be located on the Light-Shielding layer. In other examples, the first transfer line 19 may be located on a side of the first data line away from the base substrate. For example, a seventh conductive layer may be provided on a side of the sixth conductive layer away from the base substrate, the first transfer line may be located in the seventh conductive layer, and a transparent conductive material (including, for example, Indium Tin Oxide (ITO)) may be adopted in the seventh conductive layer, thereby avoiding the display effect is affected.

In some examples, the first data lines connected with a column of pixel circuits within the first partition of the display region theoretically only need to be electrically connected with the first transfer line at a location of one of the pixel circuits to achieve electrical connection with the first data auxiliary line. In other examples, the first data line may be electrically connected with the first data auxiliary line through one or more first transfer lines, or may be directly electrically connected with at least one first transfer line, and the at least one first transfer line may not be electrically connected with the first data auxiliary line, but may be used as a parallel line of the first data line to reduce a line resistance or achieve a voltage drop effect.

In other examples, the display region may be provided with a plurality of first transfer auxiliary lines, and an arrangement mode of the plurality of first transfer auxiliary lines in the display region may be the same as an arrangement mode of first transfer lines, for example, a first transfer line or a first transfer auxiliary line may be provided between any two rows of adjacent pixel circuits to achieve uniformity in an arrangement of line in the display region. In some examples, a first transfer auxiliary line disposed in the display region may be used as a parallel line of a first data line or a first data auxiliary line to achieve effect of reducing voltage or reducing line resistance. For example, a first transfer line in the first partition of the display region may be electrically connected with a corresponding first data line and a corresponding first data auxiliary line, and the first transfer auxiliary line within the first partition may be electrically connected with a corresponding first data line, which is equivalent to providing a parallel line to the first data line, so that a resistance of the first data line or voltage drop of the data signal can be reduced. A plurality of first transfer auxiliary lines provided in the second partition may be electrically connected with corresponding first data auxiliary lines, which is equivalent to parallel lines as the first data auxiliary lines, so that resistances of the first data auxiliary lines can be reduced. However, the present embodiment is not limited thereto. In other examples, a first transfer auxiliary line disposed in the display region may not be electrically connected with a first data line and a first data auxiliary line, but may be a Dummy line, and the first transfer auxiliary line may be electrically connected with a constant voltage signal line (e.g., a low potential power supply line), or may be connected in parallel with other signal lines.

(13) An eighth insulation layer, a light emitting structure layer and an encapsulation structure layer are sequentially formed.

In some examples, an eighth insulating thin film is coated on the base substrate on which the aforementioned patterns are formed, and the eighth insulating thin film is patterned through a patterning process to form an eighth insulation layer. Subsequently, an anode thin film is deposited on the base substrate on which the aforementioned patterns are formed, and the anode thin film is patterned through a patterning process to form an anode layer. Then, a pixel definition thin film is coated and a pixel definition layer is formed by masking, exposure and development processes. The pixel definition layer may be formed with a plurality of pixel openings exposing the anode layer. An organic light emitting layer is formed in the pixel openings formed earlier, and the organic light emitting layer is connected with the anode layer. Subsequently, a cathode thin film is deposited, the cathode thin film is patterned through a patterning process to form a cathode layer, and the cathode layer is connected with the organic light emitting layer. Then, the encapsulation structure layer is formed on the cathode layer, for example, the encapsulation structure layer may include a stacked structure of an inorganic material/an organic material/an inorganic material.

In some examples, the first conductive layer, the second conductive layer, the third conductive layer, the fourth conductive layer, the fifth conductive layer, and the sixth conductive layer may be made of a metal material, such as any one or more of Argentum (Ag), Copper (Cu), Aluminum (Al), and Molybdenum (Mo), or an alloy material of the above metals, such as an Aluminum Neodymium alloy (AlNd) or a Molybdenum Niobium alloy (MoNb), and may be of a single-layer structure or a multi-layer composite structure, such as Mo/Cu/Mo. The first insulation layer, the second insulation layer, the third insulation layer, the fourth insulation layer, and the fifth insulation layer may be made of any one or more of Silicon Oxide (SiOx), Silicon Nitride (SiNx), and Silicon OxyNitride (SiON), and may be in a single layer, a multi-layer, or a composite layer. The sixth insulation layer to the eighth insulation layer may be made of an organic material, such as polyimide, acrylic, or polyethylene terephthalate. The pixel definition layer may be made of an organic material, such as polyimide, acrylic, or polyethylene terephthalate. The anode layer may be made of a reflective material such as a metal, and the cathode layer may be made of a transparent conductive material. However, the present embodiment is not limited thereto.

A structure and a preparation process of the display substrate of the embodiment are merely illustrative. In some examples, a corresponding structure may be changed and a patterning process may be added or reduced according to actual needs. The preparation process of this example may be implemented using an existing mature manufacturing equipment, and may be compatible well with an existing manufacturing process, simple in process implementation, easy to implement, high in production efficiency, low in production cost, and high in yield.

A connection mode of the second transfer line, the second data auxiliary line and the third data line may be referred to in the description of the foregoing embodiment, and thus the description thereof will not be repeated herein. In some examples, setting and arrangement modes of the second transfer line and the second data auxiliary line may be the same as setting and arrangement modes of the first transfer line and the first data auxiliary line. In other examples, a plurality of second transfer auxiliary lines may be provided in the third partition and the second partition of the display region in a same arrangement mode as the arrangement mode of the plurality of second transfer lines. An arrangement mode of the second transfer auxiliary line may be the same as or similar to the arrangement mode of the first transfer auxiliary line. For example, the second transfer auxiliary line may be served as a parallel line of the second data line or the second data auxiliary line in the third partition, and may be served as a parallel line of the second data auxiliary line in the second partition. For another example, the second transfer auxiliary line may be served as an invalid line to be electrically connected with the constant voltage signal line. In some examples, the first transfer auxiliary line and the second transfer auxiliary line within the second partition may be an integral structure, or may be disconnected and independently disposed. The present embodiment is not limited thereto.

Arrangement mode of pixel circuits and data lines of the display substrate provided in this example is beneficial to saving space and avoiding influence of data signal-related lines on other signals.

An embodiment of the present disclosure further provides a control method for a display substrate, which is applied to the display substrate as described above, and includes: at least one drive circuit providing a gate drive signal to a plurality of sub-pixels in a corresponding display partition so that display refresh frequencies of the plurality of display partitions are the same or at least partially different, where the at least one drive circuit corresponds to one display partition.

In some exemplary embodiments, the plurality of display partitions at least includes a first partition and a second partition, the first partition and the second partition are adjacent in one direction. The at least one drive circuit provides the gate drive signal to the plurality of sub-pixels within the corresponding display partition may include: when display refresh frequencies of the first partition and the second partition are the same, the first control circuit makes an output terminal of a last-stage first scan control unit of the first drive circuit and an input terminal of a first-stage second scan control unit of the second drive circuit to be connected, under a control of a first control line and a second control line; When the display refresh frequencies of the first partition and the second partition are different, the first control circuit enables a second start signal line and the input terminal of the first-stage second scan control unit of the second drive circuit to be connected, under the control of the first control line and the second control line.

In some exemplary embodiments, the plurality of display partitions may include a first partition, a second partition, and a third partition, the third partition is adjacent to the first partition in a first direction and adjacent to the second partition in a second direction; and the first direction intersects with the second direction. The at least one drive circuit provides the gate drive signal to the plurality of sub-pixels in the corresponding display partition, may further include: when display refresh frequencies of a second partition and a third partition are the same, the second control circuit, under the control of the first control line and the second control line, enables an output terminal of a last-stage third scan control unit of a third drive circuit and an input terminal of a first-stage second scan control unit of the second drive circuit adjacent to the third drive circuit to be connected; When the display refresh frequencies of the second partition and the third partition are different, the second control circuit, under the control of the first control line and the second control line, enables a second start signal line and the input terminal of the first-stage second scan control unit of the second drive circuit adjacent to the third drive circuit to be connected.

The control method of the display substrate provided by this embodiment may be referred to descriptions of the aforementioned embodiments, and will not be repeated here.

Figure 25:
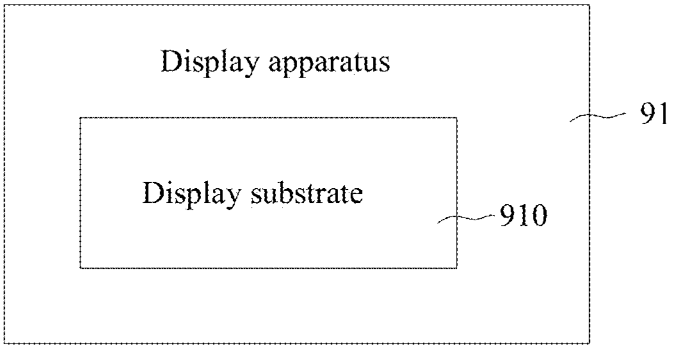
FIG. 25 is a schematic diagram of a display apparatus according to at least one embodiment of the present disclosure.

FIG. 25 is a schematic diagram of a display apparatus according to at least one embodiment of the present disclosure. In some examples, as shown in FIG. 25, the embodiment provides a display apparatus 91, including a display substrate 910 of the aforementioned embodiments. In some examples, the display substrate 910 may include an OLED display substrate, a QLED display substrate, a Micro-LED display substrate, or a Mini-LED display substrate. The display apparatus 91 may be any product or component with a display function, such as a mobile phone, a tablet computer, a television, a display, a laptop computer, a digital photo frame, and a navigator. However, the present embodiment is not limited thereto.

The drawings of the present disclosure only involve structures involved in the present disclosure, and other structures may refer to conventional designs. The embodiments of the present disclosure, i.e., features in the embodiments, may be combined with each other to obtain new embodiments if there is no conflict. Those of ordinary skills in the art should understand that modifications or equivalent replacements may be made to the technical solutions of the present disclosure without departing from the essence and scope of the technical solutions of the present disclosure, which shall all fall in the scope of the claims of the present application.

The invention claimed is:

1. A display substrate, comprising:

a base substrate comprising a display region, wherein the display region comprises a plurality of display partitions;

a plurality of sub-pixels located in the display region; and a plurality of drive circuits, wherein at least one drive circuit of the plurality of drive circuits corresponds to one display partition; and the at least one drive circuit is configured to provide a gate drive signal to the plurality of sub-pixels within a corresponding display partition to enable display refresh frequencies of the plurality of display partitions to be the same or at least partially different, wherein the plurality of display partitions at least comprises: a first partition and a second partition, and the first partition and the second partition are adjacent in a direction; the display substrate further comprises a first control circuit, and the plurality of drive circuits comprises at least one first drive circuit and at least one second drive circuit;

when display refresh frequencies of the first partition and the second partition are the same, the first control circuit is configured to enable an output terminal of a last-stage first scan control unit of the at least one first drive circuit and an input terminal of a first-stage second scan control unit of the at least one second drive circuit to be connected under control of a first control line and a second control line; and when the display refresh frequencies of the first partition and the second partition are different, the first control circuit is configured to enable a second start signal line and the input terminal of the first-stage second scan control unit of the at least one second drive circuit to be connected under control of the first control line and the second control line.

2. The display substrate according to claim 1, wherein the at least one first drive circuit is configured to provide a gate drive signal to the plurality of sub-pixels within the first partition, and the at least one second drive circuit is configured to provide a gate drive signal to the plurality of sub-pixels within the second partition.

3. The display substrate according to claim 2, wherein the first control circuit is connected between the at least one first drive circuit and a second drive circuit adjacent to the at least one first drive circuit, wherein the first control circuit is configured to control the display refresh frequencies of the first partition and the second partition to be the same or different.

4. The display substrate according to claim 3, wherein the at least one first drive circuit at least comprises a plurality of cascaded first scan control units, the at least one second drive circuit at least comprises a plurality of cascaded second scan control units.

5. The display substrate according to claim 4, wherein the first control circuit comprises a first control transistor and a second control transistor; a gate electrode of the first control transistor is electrically connected with the first control line, a first electrode of the first control transistor is electrically connected with the output terminal of the last-stage first scan control unit of the at least one first drive circuit, and a second electrode of the first control transistor is electrically connected with the input terminal of the first-stage second scan control unit of the at least one second drive circuit; and a gate electrode of the second control transistor is electrically connected with the second control line, a first electrode of the second control transistor is electrically connected with the second start signal line, and a second electrode of the second control transistor is electrically connected with the input terminal of the first-stage second scan control unit of the at least one second drive circuit.

6. The display substrate according to claim 2, further comprising at least one first data line electrically connected with the plurality of sub-pixels within the first partition and at least one second data line electrically connected with the plurality of sub-pixels within the second partition; and extension direction of the at least one first data line and the at least one second data line are the same, and the at least one first data line and the at least one second data line are in a same layer.

7. The display substrate according to claim 6, wherein within the first partition, the at least one first data line is electrically connected with a first data auxiliary line through a first transfer line, an extension direction of the first transfer line is intersected with an extension direction of the first data auxiliary line, and the first data auxiliary line is extended to the second partition.

8. The display substrate according to claim 7, wherein the first transfer line is located on a side of the first data auxiliary line close to the base substrate, and the first data auxiliary line and the first data line are in a same layer.

9. The display substrate according to claim 7, wherein in a direction perpendicular to the display substrate, the display region comprises: a base substrate, and a first semiconductor layer, a first conductive layer, a second conductive layer, a second semiconductor layer, a third conductive layer, a fourth conductive layer, a fifth conductive layer and a sixth conductive layer that are disposed on the base substrate; and the first transfer line is located in the fifth conductive layer, and the first data auxiliary line, the first data line, and the second data line are located in the sixth conductive layer.

10. The display substrate of claim 7, wherein the sub-pixels comprise pixel circuits, and the display region comprises at least one pixel circuit group comprising two pixel circuits disposed adjacent to each other along a direction, wherein the two pixel circuits in the at least one pixel circuit group are disposed symmetrically with respect to a center-line of the pixel circuit group in the direction.

11. The display substrate according to claim 10, wherein the two pixel circuits in the at least one pixel circuit group are electrically connected with a same first power supply line, the first power supply line is located between data lines which are respectively electrically connected with the two pixel circuits, and the first data auxiliary line is located on a side of the data line, electrically connected with a pixel circuit of the two pixel circuits, away from the first power supply line.

12. The display substrate according to claim 2, wherein the plurality of display partitions further comprises a third partition adjacent to the first partition in a first direction, wherein the second partition is located on a same side of the first partition and third partition in a second direction; and the first direction is intersected with the second direction;

the plurality of drive circuits comprises one first drive circuit, two second drive circuits, and one third drive circuit, wherein the third drive circuit is configured to provide a gate drive signal to the plurality of sub-pixels within the third partition; and the two second drive circuits are located on two opposite sides of the second partition along the first direction, the first drive circuit is adjacent to the first partition in the first direction, the third drive circuit is adjacent to the third partition in the first direction, the first drive circuit is adjacent to one second drive circuit in the second direction, and the third drive circuit is adjacent to another second drive circuit in the second direction.

13. The display substrate according to claim 12, further comprising a second control circuit connected between the third drive circuit and a second drive circuit adjacent to the third drive circuit, wherein the second control circuit is configured to control display refresh frequencies of the second partition and the third partition to be the same or different.

14. The display substrate according to claim 13, wherein the third drive circuit at least comprises a plurality of cascaded third scan control units; and the second drive circuit at least comprises a plurality of cascaded second scan control units; and the second control circuit is configured to, under control of the first control line and a second control line, enable an output terminal of a last-stage third scan control unit of the third drive circuit and an input terminal of a first-stage second scan control unit of an second drive circuit adjacent to the third drive circuit to be connected, or enable a second start signal line and the input terminal of the first-stage second scan control unit of the second drive circuit adjacent to the third drive circuit to be connected.

15. The display substrate according to claim 12, further comprising at least one third data line electrically connected with the plurality of sub-pixels within the third partition; wherein within the third partition, the at least one third data line is electrically connected with a second data auxiliary line through a second transfer line, an extension direction of the second transfer line is intersected with an extension direction of the second data auxiliary line, and the second data auxiliary line is extended to the second partition.

16. The display substrate according to claim 15, wherein the second transfer line is located on a side of the second data auxiliary line close to the base substrate, and the second data auxiliary line and the third data line are in a same layer.

17. A display apparatus, comprising a display substrate according to claim 1.

18. A control method for a display substrate, applied to the display substrate according to claim 1, wherein the control method comprises:

providing, by the at least one drive circuit, the gate drive signal to the plurality of sub-pixels within the display partition corresponding to the at least one drive circuit, to cause the display refresh frequencies of the plurality of display partitions to be the same or at least partially different; wherein the at least one drive circuit corresponds to one display partition, wherein providing, by the at least one drive circuit, the gate drive signal to the plurality of sub-pixels within the display partition corresponding to the at least one drive circuit comprises:

when display refresh frequencies of the first partition and the second partition are the same, the first control circuit enables an output terminal of a last-stage first scan control unit of a first drive circuit and an input terminal of a first-stage second scan control unit of a second drive circuit to be connected under control of the first control line and the second control line; and when the display refresh frequencies of the first partition and the second partition are different, the first control circuit enables a second start signal line and the input terminal of the first-stage second scan control unit of the second drive circuit to be connected under control of the first control line and the second control line.

19. The method according to claim 18, wherein the plurality of display partitions further comprises a third partition adjacent to the first partition in a first direction, the second partition is located on a same side of the first partition and the third partition in a second direction; and the first direction is intersected with the second direction, wherein providing, by the at least one drive circuit, the gate drive signal to the plurality of sub-pixels within the display partition corresponding to the at least one drive circuit further comprises:

when display refresh frequencies of the second partition and the third partition are the same, a second control circuit enables an output terminal of a last-stage third scan control unit of a third drive circuit and an input terminal of a first-stage second scan control unit of a second drive circuit adjacent to the third drive circuit to be connected under control of the first control line and the second control line; and when the display refresh frequencies of the second partition and the third partition are different, the second control circuit enables the second start signal line and the input terminal of the first-stage second scan control unit of the second drive circuit adjacent to the third drive circuit to be connected under control of the first control line and the second control line.

* * * * *